(12) United States Patent
Craige et al.

(10) Patent No.: US 11,552,792 B2
(45) Date of Patent: Jan. 10, 2023

(54) SYSTEMS AND METHODS FOR GENERATING SIGNATURES

(71) Applicant: Coinbase, Inc., San Francisco, CA (US)

(72) Inventors: Jake Craige, San Francisco, CA (US); Jesse Posner, San Francisco, CA (US); Adam Everspaugh, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 202 days.

(21) Appl. No.: 17/130,333

(22) Filed: Dec. 22, 2020

(65) Prior Publication Data

US 2021/0111877 A1    Apr. 15, 2021

Related U.S. Application Data

(63) Continuation of application No. 16/983,216, filed on Aug. 3, 2020, now Pat. No. 10,903,991.

(60) Provisional application No. 62/946,912, filed on Dec. 11, 2019, provisional application No. 62/881,711, filed on Aug. 1, 2019, provisional application No. 62/881,729, filed on Aug. 1, 2019.

(51) Int. Cl.
*H04L 29/06* (2006.01)
*H04L 9/08* (2006.01)
*H04L 9/32* (2006.01)

(52) U.S. Cl.
CPC ............ *H04L 9/085* (2013.01); *H04L 9/0825* (2013.01); *H04L 9/0861* (2013.01); *H04L 9/3252* (2013.01); *H04L 9/3255* (2013.01); *H04L 2209/46* (2013.01)

(58) Field of Classification Search
CPC ..... H04L 9/085; H04L 9/0825; H04L 9/0861; H04L 9/3252; H04L 9/3255; H04L 2209/46
See application file for complete search history.

(56) References Cited

U.S. PATENT DOCUMENTS

| | | | |
|---|---|---|---|
| 5,625,692 | A | 4/1997 | Herzberg et al. |
| 5,884,274 | A | 3/1999 | Walker et al. |
| 6,125,186 | A | 9/2000 | Saito et al. |
| 6,952,683 | B1 | 10/2005 | Gerhard |
| 6,959,394 | B1 | 10/2005 | Brickell et al. |
| 7,644,037 | B1 | 1/2010 | Ostrovsky |
| 7,689,500 | B2 | 3/2010 | Cottrell |
| 7,689,550 | B2 | 3/2010 | Lee et al. |
| 7,970,823 | B2 | 6/2011 | Moeller et al. |

(Continued)

FOREIGN PATENT DOCUMENTS

| | | |
|---|---|---|
| EP | 2634738 A1 | 9/2013 |
| JP | 2007109002 A | 4/2007 |

(Continued)

OTHER PUBLICATIONS

"A plea to exchanges . . . lets do 2 factor right!" Bitcoin Forum, download from https://bitcointalk.org/index.php?topic=109424.0%E2%80%93%20Stephen%20Gomick%20NOV%205%20%2712%20at%2016:56 (posted Sep. 14, 2012), (10 pages).

(Continued)

*Primary Examiner* — Harunur Rashid
(74) *Attorney, Agent, or Firm* — Perkins Coie LLP

(57) ABSTRACT

System and method for digitally signing messages using multi-party computation.

20 Claims, 11 Drawing Sheets

(56) References Cited

U.S. PATENT DOCUMENTS

| | | | |
|---|---|---|---|
| 8,055,575 | B2 | 11/2011 | Grody et al. |
| 8,111,648 | B2 | 2/2012 | Gandham |
| 8,117,648 | B2 | 2/2012 | Slaton et al. |
| 8,606,703 | B1 | 12/2013 | Dorsey et al. |
| 8,839,386 | B2 | 9/2014 | Gilboy |
| 8,855,318 | B1 | 10/2014 | Patnala et al. |
| 9,071,429 | B1 | 6/2015 | Roth et al. |
| 9,135,787 | B1 | 9/2015 | Russell et al. |
| 9,224,262 | B2 | 12/2015 | Fine et al. |
| 9,495,668 | B1 | 11/2016 | Juels |
| 9,892,460 | B1 | 2/2018 | Winklevoss et al. |
| 10,068,228 | B1 | 9/2018 | Winklevoss et al. |
| 10,180,912 | B1 | 1/2019 | Franklin et al. |
| 10,256,983 | B1 | 4/2019 | Bauer et al. |
| 10,269,009 | B1 | 4/2019 | Winklevoss et al. |
| 10,332,205 | B1 | 6/2019 | Russell et al. |
| 10,469,309 | B1 | 11/2019 | Gupta et al. |
| 10,586,057 | B2 | 3/2020 | Keselman et al. |
| 10,733,291 | B1 * | 8/2020 | McLeod .............. G06F 11/3058 |
| 2001/0034605 | A1 | 10/2001 | Hoffman |
| 2001/0050990 | A1 | 12/2001 | Sudia |
| 2002/0023053 | A1 | 2/2002 | Szoc et al. |
| 2002/0116611 | A1 | 8/2002 | Zhou et al. |
| 2003/0048906 | A1 | 3/2003 | Vora et al. |
| 2005/0010760 | A1 | 1/2005 | Goh et al. |
| 2005/0138374 | A1 | 6/2005 | Zheng et al. |
| 2006/0168663 | A1 | 7/2006 | Viljoen et al. |
| 2007/0223706 | A1 * | 9/2007 | Gantman .............. G06F 21/602 |
| | | | 380/286 |
| 2008/0091586 | A1 | 4/2008 | Cottrell |
| 2008/0260152 | A1 | 10/2008 | Skoric et al. |
| 2008/0263363 | A1 | 10/2008 | Jueneman et al. |
| 2009/0037405 | A1 | 2/2009 | Lee et al. |
| 2009/0144810 | A1 | 6/2009 | Gilboy |
| 2009/0205036 | A1 | 8/2009 | Slaton et al. |
| 2009/0217034 | A1 | 8/2009 | Sudia et al. |
| 2009/0254750 | A1 | 10/2009 | Bono et al. |
| 2010/0054458 | A1 | 3/2010 | Schneider |
| 2010/0175061 | A1 | 7/2010 | Maeda et al. |
| 2010/0235588 | A1 | 9/2010 | Maeda et al. |
| 2011/0071958 | A1 | 3/2011 | Grody et al. |
| 2011/0087582 | A1 | 4/2011 | Pak et al. |
| 2011/0106675 | A1 | 5/2011 | Perlman |
| 2011/0202755 | A1 | 8/2011 | Orsini et al. |
| 2011/0251941 | A1 | 10/2011 | Dunwoody |
| 2012/0136782 | A1 | 5/2012 | Norman et al. |
| 2012/0150750 | A1 | 6/2012 | Law et al. |
| 2012/0239556 | A1 | 9/2012 | Magruder et al. |
| 2013/0010966 | A1 | 1/2013 | Li et al. |
| 2013/0065670 | A1 | 3/2013 | Michaelson et al. |
| 2013/0166455 | A1 | 6/2013 | Feigelson |
| 2013/0191632 | A1 | 7/2013 | Spector et al. |
| 2013/0246261 | A1 | 9/2013 | Purves et al. |
| 2013/0290710 | A1 | 10/2013 | Broder et al. |
| 2013/0339738 | A1 | 12/2013 | Shaw |
| 2013/0343546 | A1 | 12/2013 | Shibutani et al. |
| 2014/0019352 | A1 | 1/2014 | Shrivastava |
| 2014/0025473 | A1 | 1/2014 | Cohen |
| 2014/0052617 | A1 | 2/2014 | Chawla et al. |
| 2014/0057599 | A1 | 2/2014 | Hazari |
| 2014/0082749 | A1 | 3/2014 | Holland et al. |
| 2014/0108223 | A1 | 4/2014 | Xiao |
| 2014/0156512 | A1 | 6/2014 | Rahman et al. |
| 2014/0172633 | A1 | 6/2014 | Dogin et al. |
| 2014/0229739 | A1 | 8/2014 | Roth et al. |
| 2014/0274327 | A1 | 9/2014 | Fine et al. |
| 2014/0279436 | A1 | 9/2014 | Dorsey et al. |
| 2014/0289118 | A1 | 9/2014 | Kassemi et al. |
| 2014/0297537 | A1 | 10/2014 | Kassemi et al. |
| 2014/0304171 | A1 | 10/2014 | Mertens et al. |
| 2015/0033301 | A1 | 1/2015 | Pianese et al. |
| 2015/0039444 | A1 | 2/2015 | Hardin et al. |
| 2015/0050987 | A1 | 2/2015 | Huang et al. |
| 2015/0120569 | A1 | 4/2015 | Belshe et al. |
| 2015/0127495 | A1 | 5/2015 | Houri |
| 2015/0170112 | A1 | 6/2015 | Decastro |
| 2015/0178693 | A1 | 6/2015 | Solis |
| 2015/0209678 | A1 | 7/2015 | Edwards et al. |
| 2015/0220928 | A1 | 8/2015 | Allen |
| 2015/0227897 | A1 | 8/2015 | Loera |
| 2015/0228004 | A1 | 8/2015 | Bednarek et al. |
| 2015/0262139 | A1 | 9/2015 | Shtylman |
| 2015/0262171 | A1 | 9/2015 | Langschaedel et al. |
| 2015/0262173 | A1 | 9/2015 | Durbin et al. |
| 2015/0287026 | A1 | 10/2015 | Yang et al. |
| 2015/0294308 | A1 | 10/2015 | Pauker et al. |
| 2015/0302401 | A1 | 10/2015 | Metral |
| 2015/0310424 | A1 | 10/2015 | Myers |
| 2015/0332256 | A1 | 11/2015 | Minor |
| 2015/0365283 | A1 | 12/2015 | Ronca et al. |
| 2016/0034896 | A1 | 2/2016 | O'Brien et al. |
| 2016/0085955 | A1 | 3/2016 | Lerner |
| 2016/0086418 | A1 | 3/2016 | Smolen et al. |
| 2016/0171570 | A1 | 6/2016 | Dogin et al. |
| 2016/0203572 | A1 | 7/2016 | Mcconaghy et al. |
| 2016/0261411 | A1 | 9/2016 | Yau et al. |
| 2016/0277398 | A1 | 9/2016 | Dregg et al. |
| 2016/0321654 | A1 | 11/2016 | Lesavich et al. |
| 2016/0380767 | A1 | 12/2016 | Hayashi et al. |
| 2017/0063531 | A1 | 3/2017 | Sullivan |
| 2017/0083718 | A1 | 3/2017 | Peddada et al. |
| 2017/0161439 | A1 | 6/2017 | Raduchel et al. |
| 2018/0075453 | A1 | 3/2018 | Durvasula et al. |
| 2018/0176112 | A1 | 6/2018 | Mclaughlin et al. |
| 2018/0191503 | A1 | 7/2018 | Alwar et al. |
| 2018/0248704 | A1 | 8/2018 | Coode et al. |
| 2018/0367316 | A1 | 12/2018 | Cheng et al. |
| 2019/0236245 | A1 | 8/2019 | Desarzens et al. |
| 2019/0288840 | A1 | 9/2019 | Gallancy et al. |
| 2020/0036707 | A1 * | 1/2020 | Callahan ................ H04L 67/53 |
| 2020/0084027 | A1 * | 3/2020 | Duchon ................ H04L 9/0861 |

FOREIGN PATENT DOCUMENTS

| | | |
|---|---|---|
| WO | 0184906 A2 | 11/2001 |
| WO | 2014190323 A1 | 11/2014 |

OTHER PUBLICATIONS

"Bitcoin Explained Like You're Five Part 3—Cryptography", https://chrispacia.wordpress.com/2013/09/07/bitcoin-cryptography-digital-signatures-explained/, 2013, (21 pages).

"blockchainCreate", http://blockchain.info:80/wallet/faq, dated Jan. 9, 2012, (5 pages).

"How to sell Lindens" dated Mar. 6, 2013 (Year: 2013).

"NIST", Archived NIST Technical Series Publication, dated Jul. 2012, sp 800-57_part1_rev3_general.pdf, (148 pages).

"Off-the-chain transactions", downloaded from http://gavintech.blogspot.com/2012/07/off-chain-transactions.html, dated Jul. 3, 2012 (Year: 2012), (4 pages).

Stinson, Douglas, et al., "Provably Secure Distributed Schnorr Signatures and a (t, n) Threshold Scheme for Implicit Certificates", Australasian Conference on Information Security and Privacy ACISP 2001: Information Security and Privacy pp. 417-434.

"Securing your wallet", download from https://bitcoin.org/en/secure-yourwallet (post from 2013), (4 pages).

"Send bitcoins to an unknown recipient", Feb. 13, 2011, downloaded from https://bitcointalk.org/index.php?topic=3427.0, (Year: 2011).

"Send Bitcoins to Email Addresses!", Jan. 9, 2012, downloaded from https://web.archive.org/web/20120109084110/http://www.bitcoinmail.com/, merged and attached as PDF file, (Year: 2012).

"Transaction Fees ("Transaction fees and negative balances"", downloaded from https://bitcointalk.org/index.php?topic=6856.0 dated Apr. 30, 2011-May 1, 2011, (Year:2011), (3 pages).

Shamir, Adi, "How to Share a Secret", Communications of the ACM, Nov. 1979, vol. 22, No. 11.

Pedersen, Torben Pryds, "Non-Interactive and Information-Theoretic Secure Verifiable Secret Sharing", Advances in Cryptology, CRYPTO '91, LNCS 576, pp. 129-140, 1992.

(56) References Cited

OTHER PUBLICATIONS

"Wholesale Payment Systems: Interbank Payment and Messaging System, Fedwire and Clearing House Interbank Payment Systems (CHIPS)", https://www.ffiec.gov/ffiecinfobase/booklets/Wholesale/02.html, Dec. 16, 2005, 3 pages).

"You Can Now Send Bitcoins over Email with Tip Bot", Feb. 26, 2014, downloaded from https://www.coindesk.com/can-now-send-bitcoins-email-tip-bot, (Year: 2014).

Beal, Alex, "Backing Up Sensitive Data With Secret Sharing", downloaded from https:www.usrsb.in/secret-sharing-backup.html, dated Feb. 23, 2013) (Year: 2013), (8 pages).

Bitcoin Explained ("Bitcoin Explained Like You're Five, Part 4-Securing Your Wallet," bitcoin-explained-like-youre-five-part-4-securing-your-wallet/ attached as PDF file, dated Sep. 29, 2013) (Year: 2013) https://chrispacia.wordpress.com/2013/09/29/.

Computer Arch (http://www.math.uaa.alaska.edu/~afkjm/cs101 /handouts/ComputerArch.pdf attached as pdf, dated Sep. 10, 2009).

Dion, Derek A., "I'll gladly trade you two bits on Tuesday for a byte today: Bitcoin, regulating fraud in the e-conomy of Hacker-cash", Journal of Law, Technology & Policy, vol. 2013, pp. 165-201.

Douget, Joshua J., "The Nature of the Form:Legal and Regulatory issues surrounding the Bitcoin digital currency system", Louisiana Law Review, vol. 73, No. 1 Summer 2013, pp. 1118-1153.

International Search Report and Written Opinion for PCT Application No. PCT/US2019/027857 dated Jul. 15, 2019.

Meiklejohn, Sarah et al., "A fistful of bitcoins: Characterizing Payments among men with no names", 2013, (8 pages).

Wallace, Benjamin, "The rise and fall of bitcoin", Magazine, WIRED, https://www.wired.com/2011 /11 /mf_bitcoin/all/1., Nov. 23, 2011, pp. 1-17.

"Blockchain ("How do off chain transactions work?" downloaded from https://bitcoin.stackexchange.com/questions/123530/how-do-off-chain-transactions-work, year 2013."

"Coin Selection Algorithm—What is the coin selection algorithm", downloaded from https://web.archive.org/web/20130228073524/https://bitcoin.stackexchange.com/questions/1077/what-is-the-coin-selection-algorithm dated Feb. 27, 2014.

"GitHub for SelectCoin code", https://github.com/trottier/original-bitcoin/blob/master/src/main.cpp, lines 2410-2510, dated Apr. 4, 2013.

"How Bitcoin Works, downloaded from https://www.forbes.com/sites/investopedia/2013/08/01/how-bitcoin-works/#284bd94a17ff, dated Aug. 1, 2013, attached as PDF file. (Year: 2013)".

"Inputs.io FAQ", https://inputs.io/faq, 2013.

International Search Report and Written Opinion of the ISA dated Dec. 18, 2019 for PCT/US19/52371.

"Multi-Party Threshold Signature Scheme", https://github.com/binance-chain/tss-lib#readme.

"NPL4, Importing Bitcoin from a paper wallet into Electrum", https://thecleverest.com/, dated Mar. 12, 2014.

"Proactive secret sharing", Wikipedia, https://en.wikipedia.org/wiki/Proactive_secret_sharing.

"Strongcoin—The safest Bitcoin e-wallet on the planet", https://www.javaworld.com/article/2078467/bitcoin-for-beginners-part-2-bitcoin-as-a-technology-and-network.html, year 2013.

"Whose bank account is it anyway?", McMillan LLP, Jun. 24, 2011, downloaded from http://www.lexology.com/library/detail.aspx?g20the%20parties.attached as PDF file (Year: 2011).

Antonopoulos, Andreas M., "Mastering Bitcoin Unlocking Digital Crypto-Currencies", 2014.

Bernstein, Daniel J., "Curve25519: new Differentiations-Hellman speed records", 9th International Conference on Practice and Theory in Public-Key Cryptography, New York NY, USA, Apr. 24-26, 2006, Proceedings pp. 207-228, (Lecture Notes in Computer Science; vol. 3958), https://cr.yp.to/ecdh/curve25519-20060209.pdf.

Berstein, Daniel J., et al., "High-speed high-security signatures", Journal of Cryptographic Engineering vol. 2, pp. 77-89(2012), Published: Aug. 14, 2012.

Bradbury, Danny, "BitGo Safe Aims to Secure Bitcoin Wallets with Multi-Signature Transactions", CoinDesk, The Voice of Digital Currency, http://web.archive.org/web/20140108021304/http://www.coindesk.com/, published Dec. 19, 2013.

Breitner, Joachim , et al., "Biased Nonce Sense: Lattice Attacks against Weak ECDSA Signatures in Cryptocurrencies", Financial Cryptography and Data Security, pp. 3-20, DOI: 10.1007/978-3-030-32101-7_1, Sep. 2019.

Davis, Don , "Defective Sign & Encrypt in S/Mime, PKCS#7, MOSS, PEM, PGP, and XML", The Proceedings of the 2001 UNSENIX Annual Technical Conference, Jun. 25-30, 2001, Boston, Massachusetts, USA, pp. 65-78 of the Proceedings.

Gennaro, Rosario , et al., "Revisiting the Distributed Key Generation for Discrete-Log Based Cryptosystems", https://pdfs.semanticscholar.org/642b/d1bbc86c7750cef9fa770e9e4ba86bd49eb9.pdf, 2003.

Krawczyk, H., et al., "HMAC-based Extract-and-Expand Key Derivation Function (HKDF)", Internet Engineering Task Force (IETF), May 2010, https://tools.ietf.org/html/rfc5869.

Lee, Leland , et al., "Alternative Signatures Schemes", Medium, Feb. 12, 2019, https://medium.com/blockchain-at-berkeley/alternative-signatures-schemes-14a563d9d562.

Marlinspike, Moxie , et al., "The X3DH Key Agreement Protocol", Signal, Revision 1, Nov. 4, 2016.

Merkel, Dirk , "Bitcoin for beginners, Part 2: Bitcoin as a technology and network", Javaworld, Dec. 6, 2011.

Neuman, Nick, "KeySplit-Tackling the hard parts of being your own bank", https://medium.com/@nickneuman/keysplit-private-key-security-for-cryptocurrency-owners-d1653ea9631d, Feb. 24, 2018.

Ouaddah, Aafaf , et al., "FairAccess: a new Blockchain-based access control framework for the 1-20 Internet of Things", In: Security and Communication Networks, Feb. 19, 2017.

Tibouchi, Mehdi, "Attacks on Schnorr signatures with biased nonces", NTT Secure Platform Laboratories, ECC Workshop, Nov. 13, 2017.

International Search Report and Written Opinion for application No. PCT/US20/44716 dated Jan. 7, 2021.

\* cited by examiner

SYSTEMS AND METHODS FOR GENERATING SIGNATURES

CROSS-REFERENCE TO RELATED APPLICATIONS

This application is a continuation of U.S. patent application Ser. No. 16/983,216, filed 3 Aug. 2020, which claims the benefit of U.S. Provisional Application No. 62/881,729, filed 1 Aug. 2019, U.S. Provisional Application No. 62/881,711, filed 1 Aug. 2019, and U.S. Provisional Application No. 62/946,912, filed 11 Dec. 2019, which are each incorporated herein in its entirety by this reference.

TECHNICAL FIELD

This invention relates generally to the cryptocurrency field, and more specifically to a new and useful system and method for generating signatures.

BACKGROUND

Several cryptocurrency protocols requiring signing of transactions for operations related to management of a cryptocurrency protocol. Such transactions are typically separate from transactions for transfer of cryptocurrency assets. Ordinarily, a private key is used to sign such transactions. However, accessing and using such a private key for transaction signing can increase the likelihood of the private key being accessed by an unauthorized entity.

There is a need in the computer networking field to create a new and useful systems and methods for secure signing of transactions. This disclosure provides such new and useful systems and methods.

DESCRIPTION OF THE PREFERRED EMBODIMENTS

The following description of embodiments is not intended to limit the claims to these embodiments, but rather to enable any person skilled in the art to make and use embodiments described herein.

1. Overview.

The method for distributed signature generation functions to restrict information about a private key, such that the private key does not need to exist in the clear outside of key generation. The system and method enables cryptographic signature generation with t of n participants without requiring the signing private key to be in the clear (e.g., reconstituted) for signing.

All or portions of the method can be performed by a remote computing system, a local participant system, a combination thereof, and/or any other suitable system. Communications between systems can be: signed (e.g., with a private key of an asymmetric key pair, with a symmetric key), encrypted, and/or otherwise authenticated and/or secured.

In some variations, a quorum of signers (t of n) must collaborate to produce a valid signature, and no malicious group of adversaries can gain useful information about the private key without access to at least t signers and key-share ciphertext. In some variations, asynchronous signing is provided, where signers can be offline by default, and come online only when there is an action to take. Variations leverage a trusted key generation and key-share issuance ceremony to distribute secrets to signers, as well as an online centralized server to manage protocol state. In some variations, signing-keys (e.g., private keys) are generated in an off-line key generation ceremony.

Figure 1:
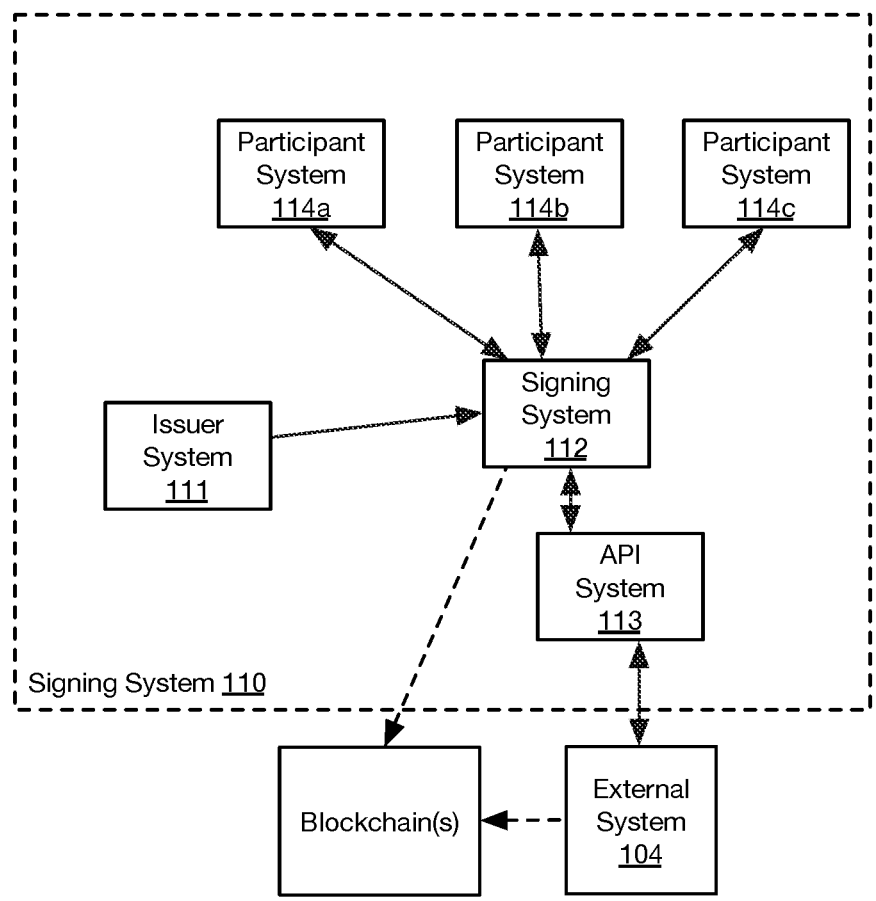
FIG. 1 is schematic representations of a system, in accordance with variations.

In some variations, a signing system (e.g., 110 shown in FIG. 1) is used to sign transactions. In some variations the signing system includes at least one of: an application programming interface (API) system (e.g., 113); an issuer system (e.g., 111); a message signing system (e.g., 112); and at least one participant system (e.g., 114a-c).

Figure 2A:
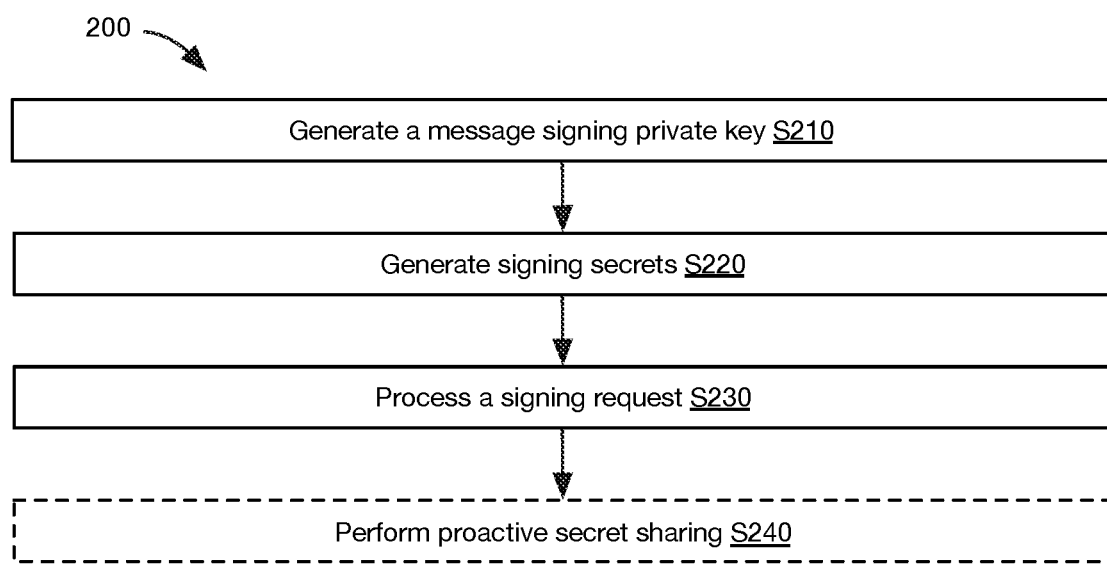
FIGS. 2A-D are representations of a method, in accordance with variations.
Figure 2B:
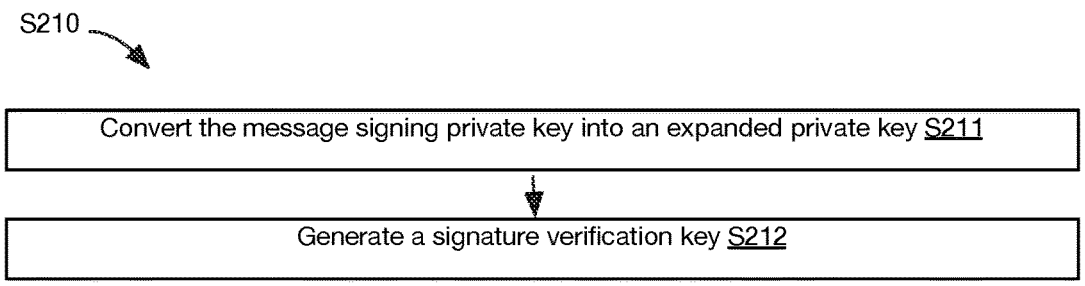
Figure 2C:
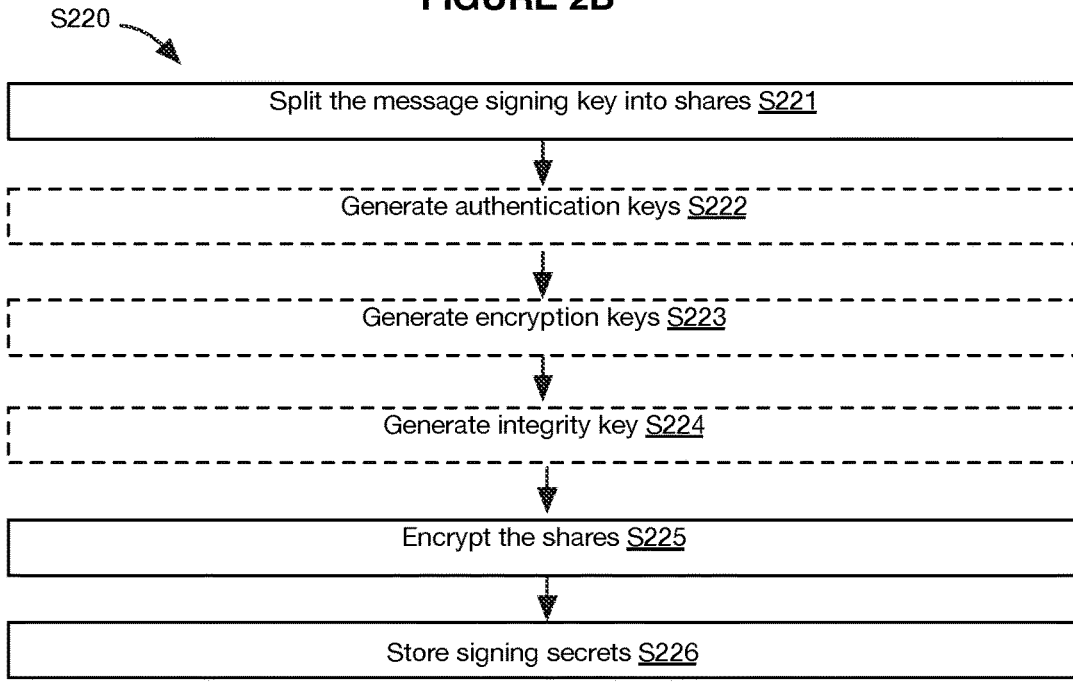

In some variations, the method (e.g., 200 shown in FIG. 2A) includes at least one of: generating a private key (e.g., S210); generating signing secrets by using the generated private key (e.g., S220); and processing a signing request by using the stored signing secrets (e.g., S230). In some implementations, at least one component of the signing system (e.g., 110) performs at least a portion of the method (e.g., 200).

In one example, the method can include: at an issuer system, generating a signing key (message signing key), splitting the signing key into secret shares encrypted to different participants, and uploading the encrypted secret shares to a message signing system. To sign a message, the method can include: with a first quorum of participants, generating a nonce for a message to be signed (e.g., using a distributed key generation method) based on the respective secret shares, splitting the nonce into nonce shares encrypted to different participants, and uploading the encrypted nonce shares to the message signing system; and at each of a second quorum of participants, generating a partial signature from the nonce shares encrypted to the respective participant, and uploading the partial signature to the message signing system; the partial signatures are then aggregated into a signature that verifies under the aggregate public key (PK) (e.g., by a participant, the message signing system, etc.), wherein the message can be signed with the signature and optionally sent to the respective blockchain network. Each participant of the first quorum can generate the nonce, a partial nonce, or other datum that is subsequently split, encrypted, and uploaded. Generating the partial signature can include, at each participant of the second quorum: downloading and decrypting the nonce shares that are encrypted to them; downloading and decrypting the signing key shares that are encrypted to them; optionally verifying the validity of all encrypted data; combining the decrypted nonce shares into a single nonce share; and creating the partial signature using the key and nonce share. This example can be coordinated by the message signing system, which can function as shared data storage and state machine coordinator, and can be blind to the private signing key and/or nonce values.

In a second example, the method includes generating a signing key sk and splitting sk into key shares using a t of n splitting construction; at each participant system of a first quorum of at least t participants, generating a nonce $r_i$ based on randomness and a key share and splitting the nonce into nonce shares using the same t of n splitting construction; at each participant system of a second quorum of at least t participants, retrieving a key share and nonce shares of the at least t nonces (from the first quorum), generating an aggregate nonce, and generating a partial signature based on a message, the key share, and the aggregate nonce; and reconstructing a signature for the message based on the at least t partial signatures.

2. Benefits.

This method can confer several benefits over conventional systems and methods.

First, messages (e.g., cryptocurrency transactions) can be signed without exposing a private key of a cryptocurrency wallet. Instead, the private key is split into shares, the shares are used to generate partial signatures, and the partial signatures are combined to generate a signature for the message. The systems generating the partial signatures do not need access to the complete private key, and the system combining the partial signatures does not need to access either the shares of the private key or the complete private key to generate a full signature for the message.

Second, messages can be signed by using on-line systems. Since the complete private key is not needed to sign the message, signing can be performed by on-line systems that have access to shares of the private key, or partial signatures. There is no need to reconstruct the private key in a secure, off-line environment to perform signing. This further enables the private keys to be reused for multiple signatures.

Third, security can be improved by distributing the signing process among a plurality of systems, rather than entrusting signing to a single trusted system.

Fourth, variants of the system and method enable valid signature generation without message signing key reconstruction. In variants leveraging Shamir's Secret Sharing (SSS) to split the message signing key, shares generated using SSS can be linearly combined to reconstruct the message signing key as long as t of n shares are available. This allows any participant to construct a valid signature as long as t of n partial signatures, generated using the same message (m), but different message signing key shares, are available. For signing protocols that require one or more pieces of additional signing data (e.g., a nonce), the additional signing data can be collectively generated, particularly when one or more participants each determine respective additional signing data from a respective private key share and/or the message (e.g., by generating the data using a random value, hashing the private key share and the message, etc.). Furthermore, when an additional signing data itself is split using SSS (e.g., with the same t of n configuration), its shards are also linearly combinable with shards of additional signing data generated using a different message signing key share, such that a partial signature generated using shards from multiple additional signing data (each generated from a different message signing key share) can be aggregated with other partial signatures (generated in the same manner) to generate a valid signature.

Additional benefits can be provided by the systems and methods disclosed herein.

3. System.

The signature generation method is preferably performed with a signing system 110, but can alternatively be performed with a different system. The signing system 110 preferably functions to facilitate message signing. In a first variation, the signing system 110 functions to sign messages (e.g., cryptocurrency transactions). In a second variation, the signing system 110 functions to coordinate signature generation for a message. For example, the signing system 110 can function as a shared data storage, as a state machine coordinator, to verify the authorization key signatures of the participants requesting or sending data, or perform other functionalities. The signing system is preferably blind (e.g., has no knowledge of, cannot access) the message signing key (private signing key) and/or nonce values, but can alternatively function as a participant or otherwise participate.

The message is preferably a blockchain message, compatible and verifiable with the respective blockchain that the signed message is sent to, but can alternatively be a datum or other message. The message can be: a transaction message, a governance message (e.g., for staking, delegating, voting, etc.), and/or other message. The message can be generated by: a platform, a dApp (distributed application), an exchange, a client, and/or any other suitable system. The message can be associated with a signature verification key PK, an address generated from PK, and/or any other suitable address or message signing key identifier.

The signing system 110 is preferably used with a set of keys, which can be used for authorization or verification, encryption, signing, or otherwise used. Examples of keys used with the signing system 110 include: a message signing public key (PK) (signature verification key) used to verify the final signature (e.g., generated from the signing private key, paired with the signing private key (sk)); a message signing private key (sk); a keygen integrity key ($PK_{KG}$) or public-private keypair ($PK_{KG}$, $sk_{KG}$, respectively), which can be used by participant systems to validate encrypted key shares as being provided by a known key generation system (e.g., the Issuer System 111) or process; a server authentication key ($AK_S$) or public-private keypair ($AK_S$, $ak_S$, respectively), wherein AKs can be used by participants to verify that they are communicating with the correct message signing system 112; a participant authentication key ($AK_{Pi}$) or public-private keypair ($AK_{Pi}$, $ak_{Pi}$, respectively, for participant i), wherein the public key $AK_{Pi}$ can be used for authenticating participant systems with the server and other participants; a participant encryption key ($ENK_{Pi}$) or public-private keypair ($ENK_{Pi}$, $enk_{Pi}$, respectively or $ENK_{Pi}$, $enc_{Pi}$, respectively, for participant i), wherein the public key $ENK_{Pi}$ can be used by other participants to encrypt data to the receiving participant; one or more ephemeral issuer keys ($EK_I$) used to encrypt the shares of the signing private key (sk) to each participant system; one or more participant ephemeral keys ($EK_P$) created by the participant systems when encrypting data to another participant; and/or other keys.

The message signing key (e.g., public and/or private) can be a key that conforms to any suitable message signing format or protocol. Examples of cryptocurrency signature schemes that the signing key and/or resultant signature can be compatible with include: DSA signature schemes, ECDSA signature schemes, EdDSA signature schemes (e.g., Ed25519, Ed448, etc.), pairing-based schemes (e.g., BLS), Schnorr, RSA, ring signatures, and/or any other suitable cryptocurrency signature scheme (e.g., public key algorithm). When the cryptocurrency signature scheme requires additional signing data in addition to the private key and the message (e.g., a nonce), the additional signing data is generated. The signing system 110 can be compatible with one or more cryptocurrency signature schemes. When the signing system 110 is compatible with a single cryptocurrency signature scheme, a system can include a different signing system 110 implementation for each cryptocurrency signature scheme. In some variations, the message signing private key is a sequence of randomly generated bytes. In some variations, S210 includes fetching 32 bytes of random data from a cryptographically secure random data source.

In some variations, keys $PK_{KG}$, $EK_P$, $EK_P$ are ephemeral keys. In some variations, key PK is an Ed25519 key. In some variations, keys $PK_{KG}$, $EK_P$, $AK_P$, $ENK_P$, $EK_P$, and $AK_S$ are NIST-P256 keys.

In one variation, a platform account (e.g., institution, individual, etc.) can be associated with a participant group including n or more participant key sets (e.g., wherein a participant key set can include: $AK_{Pi}$, $ak_{Pi}$, $ENK_{Pi}$, $enk_{Pi}$ for participant i), held by participants affiliated with the platform account (e.g., institution employees). The participant group (and/or platform account) can be associated with one or more message signing keys, wherein t of n participants from the participant group can cooperatively sign messages verifiable to the public message signing key (PK). Each message signing key can be associated with a keygen integrity key ($PK_{KG}$), which is associated with (and/or identifies) the keygen ceremony that generated the respective message signing key.

All or a portion of the keys can be generated by: the issuer system, the participants, and/or otherwise generated. When all keys are generated by a single system (e.g., issuer system), the keys are preferably distributed to the participants (e.g., users). The keys are preferably generated offline (e.g., in a system isolated from the Internet or other communication networks), but can alternatively be generated online. Key distribution preferably occurs offline (e.g., an HSM with the keys are physically or manually delivered to the participant), but can alternatively occur online (e.g., transferred over a secure communication channel). The plaintext version of the keys are preferably destroyed after key storage, but can alternatively be otherwise retained. The keys can be generated contemporaneously (e.g., during the same ceremony), or asynchronously (e.g., during different ceremonies). In a first example, all keys are generated during the same ceremony. In a second example, the message signing keys for a set of participants are generated after the participants' authentication and encryption keys are generated. However, the keys can be otherwise generated.

The signing system 110 preferably interfaces with one or more blockchain networks (e.g., via one or more blockchain nodes hosted by the signing system 110 or a connected system). The blockchain networks are preferably compatible with the message signing protocol(s) supported by the signing system 110, but can alternatively be incompatible. Examples of blockchain networks include UXTO-model protocols (e.g., Bitcoin, etc.); account-model protocols (e.g., Ethereum, ERC20 tokens, such as USDC, Litecoin, etc.); and/or other protocols.

The signing system 110 preferably includes at least one of: an issuer system 111; and a message signing system 112. In variants, the message signing system 110 can optionally include: an application programming interface (API) system 113; at least one participant system 114 (examples 114a-c).

In variants, the issuer system 111 functions as a secure key generation system (e.g., for generating one or more of a message signing key pair authentication key pair, encryption key pair, etc.). The issuer system is preferably a centralized processing system (e.g., a remote computing system, a cloud system, a server system, etc.), but can alternatively be a distributed computing system. The issuer system can be an offline system that is secured from public communication networks.

In some variations, the issuer system 111 performs one or more offline key generation processes. Additionally, or alternatively, the issuer system 111 can perform one or more online key generation processes. In some variations, the issuer system 111 functions to generate a signing private key during an offline key generation ceremony. In some variations, during the key generation ceremony, the issuer system in also generates a plurality of participant keys. In some variations, the issuer system 111 provides the participant keys to the participant systems 114a-c (or to users of the participant systems). Alternatively, the participant keys can be generated before the key generation ceremony, wherein the participant keys are provided to the key generation ceremony for use.

The issuer system 111 can generate (e.g., in one or more keygen ceremonies) one or more of the keys discussed above. Alternatively, the keys can be generated by a different system. In some variations, the issuer system 111 provides each key $AK_P$, $ENK_P$ to a respective participant system (e.g., 114a-c). In some variations, the issuer system 111 provides key AKs to the message signing system 112.

In some variations, the message signing system 112 functions to coordinate and maintain a protocol state and keep track of data that is provided to participant systems for generation of a signature. The message signing system 112 can: identify the participants associated with a public signing key (PK), identify the encrypted signing key shards associated with the public signing key ($c_i$), receive encrypted nonce shares from the first quorum of participants, distribute the encrypted nonce shares that are encrypted to a requesting participant, aggregate the partial signatures, sign the message or distribute the partial signatures to a participant for message signing, authenticate every message received from a participant, and/or perform other processes. The message signing system is preferably a centralized system controlled by a platform or centralized service, but can alternatively be a distributed system or other system.

The application programming interface (API) system 113 functions to receive predetermined calls to the signing system 110, which can subsequently be sent to and fulfilled by the issuer system, message signing system 112, participant system(s) 114, and/or other system. Examples of calls include: key generation requests, message signing requests, and/or other requests.

The signing system 110 preferably interfaces with a set of participant systems. Alternatively, the signing system 110 can include the participant systems. Each participant system 114a-c functions to perform at least one process for generating a signature.

A participant system is preferably remote computing devices associated with (e.g., controlled by) a participant, but can alternatively be local and/or otherwise related to the signing system 110. Examples of participant systems include: hardware security modules (HSMs), secure cryptoprocessor chips, laptops, smartphones, mobile devices, tablets, smartwatches, desktop computers, servers and/or other computing system. The participant system can include including a processing system and memory (e.g., storing the participant's private keys and other participants' public keys). In some implementations, at least one participant system is a device (e.g., an Internet connected mobile device) has a persistent network connection (e.g., to the Internet), and optionally includes a notification module that functions to receive asynchronous notifications (e.g., notifications for authorization input, etc.). In some implementations, at least one participant system is a device with an intermittent network connection (e.g., to the Internet) (e.g., a laptop that is only connected to the network when the laptop is powered on and not in a sleep mode).

The participants (e.g., users, individual accounts, etc.) are preferably part of a participant group, wherein the participant set is associated with a platform account (e.g., associated with an entity). A given participant can be associated with one or more participant groups.

Each participant system can store a participant key set, which can include: a participant authentication key ($AK_{Pi}$, $ak_{Pi}$, respectively, for participant i) and a participant encryption key ($ENK_{Pi}$, $enk_{Pi}$, respectively or $ENC_{Pi}$, $enc_{Pi}$, respectively, for participant i), but can additionally or alternatively be associated with other keys. The participant system can optionally store the public keys for the message signing system (e.g., server, central system), the issuer, and/or other systems.

In some variations, participant systems include participant systems managed by humans and participant systems managed by server(s) of the signing system no. In some variations, server-managed participant systems are used to improve security. By using server-managed participant systems, humans managing human-managed participant systems do not need to be trusted. Users of server-managed participant systems can prevent an attack where a malicious set of t human participants collude in an attempt to reconstruct the signing private key. In some variations, a threshold of human-managed participant systems and server-managed participant systems are required to be compromised for an attack to be successful.

Figure 5:
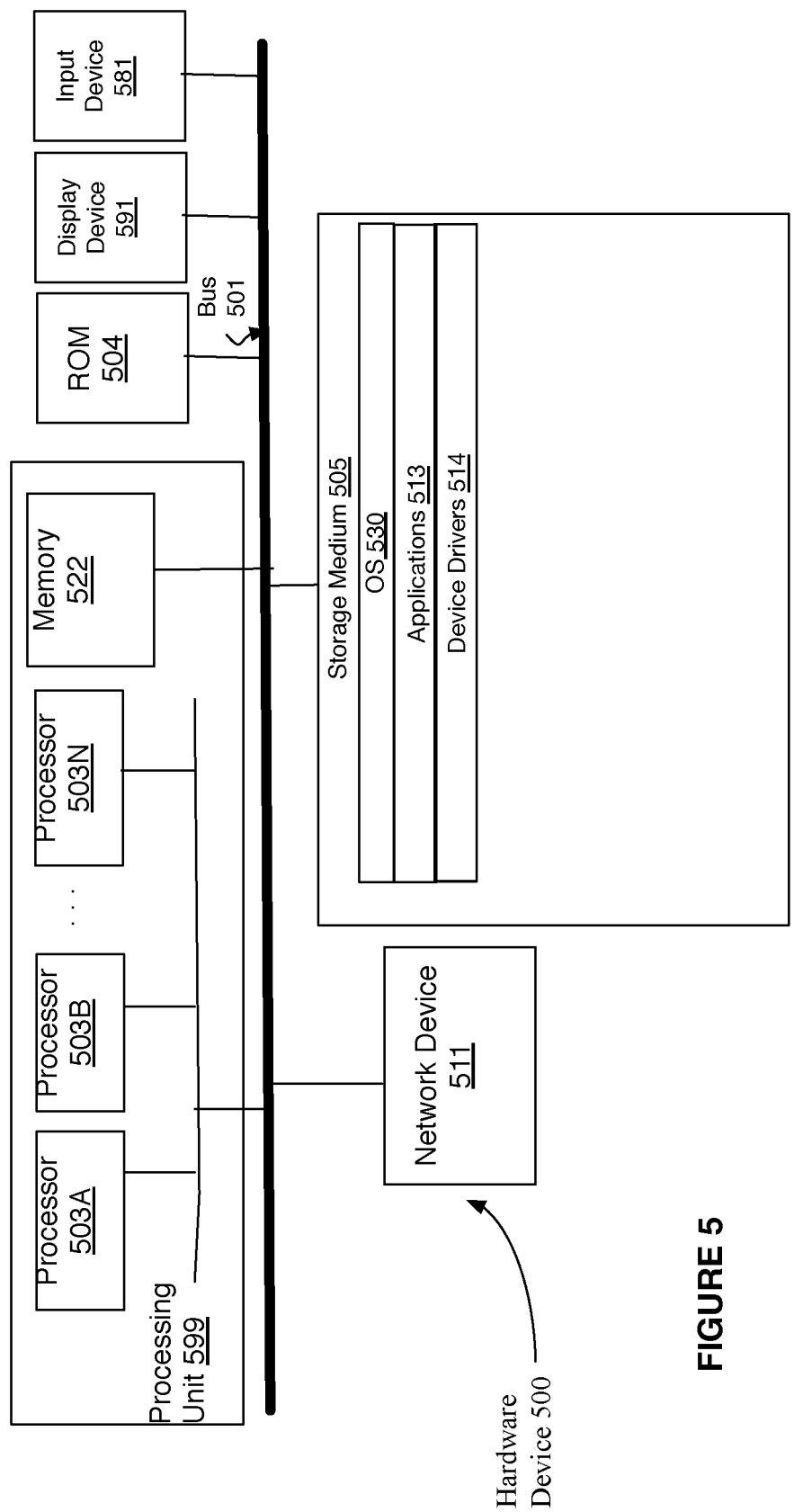
FIG. 5 is a representation of a system, in accordance with variations.

In some variations, one or more of the components of the system are implemented as a hardware device (e.g., 500 shown in FIG. 5) that includes one or more of a processor (e.g., 503a-n), a display device (e.g., 591), a memory (e.g., 522), a read only memory (ROM) (e.g., 504), a storage device (e.g., 505), an audible output device, an input device (e.g., 581), an output device, and a communication interface (e.g., 511). In some variations, one or more components included in hardware device are communicatively coupled via a bus (e.g., 501). In some variations, one or more components included in the hardware device are communicatively coupled to an external system via the communication interface.

Processors can include one or more of a CPU (central processing unit), GPU (graphics processing unit), NPU (neural processing unit), and any other suitable processing system that functions to execute machine-readable instructions. In variants, at least one of a processor and a memory can be included in a processing unit (e.g., 599).

The communication interface functions to communicate data between the hardware device and another device via a network (e.g., a private network, a public network, the Internet, and the like).

The storage devices can include machine-executable instructions (and optionally data) for one or more of an operating system 530, applications 513, and device drivers 514.

In some variations, the storage device includes the machine-executable instructions for performing at least a portion of the method 200 described herein.

In some variations, at least one component of the system performs at least a portion of the method 200 described herein.

4. Method.

FIGS. 2A-D are flowchart representations of a method 200. In some variations, the method 200 includes at least one of: generating a private key S210; generating signing secrets by using the generated private key S220; and processing a signing request by using the stored signing secrets S230. In some implementations, at least one component of the signing system 110 performs at least a portion of the method 200. All or portions of the method can be performed automatically (e.g., without user input), manually, in response to user input (e.g., user approval, user connection of the respective participant system to a network, etc.), or otherwise performed.

The method can leverage verifiable secret sharing in one or more steps of the method. VSS can function to provide a proof (VSS) alongside a secret share (e.g., of the message signing key, of a nonce) that allows the recipient to verify it was honestly generated, and that the sender or system generating the proof knew the secret that was shared. In variants, the VSS can serve as a knowledge of secret key proof (KOSK) that the system generating the proof knows the discrete log of the public key it is creating the proof for. In one example, the signing secret sharing proof is a set of commitments to coefficients of a sharing polynomial used to split the message signing key into shares, and is generated with $\{V_j = a_j G\}_{j \in [t]}$. To verify the proof, the verifier (e.g., receiver) with the share $(s_i)$ (e.g., of the message signing key $k_i$ or nonce) checks the equality of the following:

$$s_i G = \sum_{j=0}^{t-1} V_j \cdot i^j$$

for t participants, and/or verifies that the provided PK equals the free-coefficient commitment $V_{k,o}$ in $\bar{V}_k$ The method can leverage mutual authentication in one or more steps of the method. In variants, the receiver and sender (e.g., participants and server) are able to mutually authenticate each other by signing the request and response payloads with the respective authentication keys (e.g., with $ak_{Pi}$ or $ak_S$, respectively). In a specific example, participants making a request to the server must sign the full payload with their participant authentication key, wherein the server must verify the signature is valid and belongs to a known participant before proceeding. In this example, response payloads from the server must be signed with the server authentication key, wherein the participant must verify the signature is valid and matches the known server authentication key before proceeding. Similarly, recipient participants must verify that the sending participant's signature is valid before proceeding. However, the messages can be otherwise authenticated.

The method can leverage Authenticated Key Exchange (AKE) and/or Authenticated Encryption with Associated Data (AEAD) in one or more steps of the method (e.g., for all communication between two parties). This can enable secret data (e.g., nonce, other signing secrets) to be shared with participants such that only the sender and receiver know the plaintext content and can verify the participant who created it. In a specific example, this can be accomplished by deriving a shared secret with AKE and encrypting the shared secret with AEAD. However, this can be otherwise accomplished.

In an example, AKE can include, for sender $P_i$ and recipient $P_j$:

$$DH1=DH(AK_{Pi}, ENK_{Pj})$$

$$DH2=DH(EK_{Pi}, AK_{Pj})$$

$$DH3=DH(EK_{Pi}, ENK_{Pj})$$

secret encryption key=KDF(DH1∥DH2∥DH3)

where secret encryption key is a symmetric key used to encrypt the message. The recipient can independently derive the secret encryption key (e.g., using the same method, with their information), and decrypt ciphertext received from the sender. In this example, $(AK_{Pi}, EK_{Pi})$ can be participant i's authentication key and a random ephemeral key for the message, respectively, and $(AK_{Pi}, EK_{Pi})$ can be participant j's authentication key and encryption key, respectively. DH1, DH2, and DH3 can be generically represented as DH(PK1, PK2), where PK1 and PK2 are generic placeholders. DH(PK1, PK2) can represent the shared secret from an Elliptic-Curve Diffie-Hellman (ECDH) function between the keys (PK1, sk2) and (PK2, sk1) for (public, private) key pairs (PK1, sk1) and (PK2, sk2) and wherein KDF(k) computes a specified number of output bytes from HKDF (Hash-based Key Derivation Function) which accepts an arbitrary sized byte sequence as input, and wherein wherein $EK_{Pi}$, is an ephemeral key of the sending system. However, any other suitable key exchange method can be used. Alternatively, one-time keys and/or signed pre-keys can be used. The keys can be static (e.g., not regularly rotated, which minimizes the number of keys a participant needs to track and reduces the need to retain large amounts of keys, re-encrypting old data to new keys, and/or burning previously-encrypted data on rotation), but can alternatively be rotated (e.g., using proactive secret sharing or another method).

When AEAD is used, the ciphertext can include cleartext associated data. The associated data can include the public authentication keys for simple identification of who the message relates to. The associated data can optionally include information about the message contents (e.g., ciphertext type, such as an identifier for a nonce, different identifier for a signing key, etc.; protocol versioning), and/or other information. For example, the symmetric secret key generated using AKE can be used to encrypt the message: Encrypt (sk, message, $AK_{Pi}\|AK_{Pj}$).

The method can leverage a distributed signing data generation protocol (e.g., a distributed signature generation protocol, a distributed key generation protocol, a distributed nonce generation protocol, etc.) in one or more steps (e.g., additional data generation). This can include: sending shares of secret data (e.g., message signing key, nonce) to other participants, wherein the other participants perform a computation, shards and encrypts the result to the other n participants, and returns the encrypted shards. For example, this can include having each participant generate a nonce and create shares of it to send to other participants.

Throughout the method, cleartext versions of some or all secret data (e.g., message signing key, message signing key shares, nonce, etc.) can be deleted after encryption or otherwise managed.

Generating a private key S210 functions to generate a message signing private key (sk). In a first variation, the issuer system 111 performs S210 (e.g., in a secure, offline key generation ceremony). In a second variation, one or more systems perform a distributed key generation process (e.g., an on-line process, such as using a threshold signing method) to generate the message signing private key. However, the message signing private key can be generated in any suitable manner.

In some variations, the private key is converted into an expanded private key (epk) (S211). In some implementations, the expanded private key is an expanded private key of a key pair for an Ed25519 signature. Alternatively, the private key can be a private key of a key pair for any suitable type of signature. In some variations, converting the private key into an expanded private key includes hashing the private key with SHA512 and extracting the first 32 bytes of the hash output as a digest; and changing some bits of the digest, wherein the changed digest is the expanded private key. However, keys generated at S210 can conform to any suitable format or protocol.

In some implementations, S210 includes generating a signature verification key (S212). In some implementations, the signature verification key is a public key (PK) of a key pair that includes the message signing private key (sk), and the public key is used to verify a signature generated by using the message signing private key.

In some implementations, the expanded private key (generated at S211) is used to derive the signature verification key (e.g., PK). In some implementations, deriving the signature verification key includes performing scalar multiplication on the expanded private key. In some implementations, the scalar multiplication is performed by using a base point according to the following equations: dG=Y, wherein d is the expanded private key, G is the base point, and Y is the public key (PK). However, the signature verification key can be otherwise generated.

Figure 6:
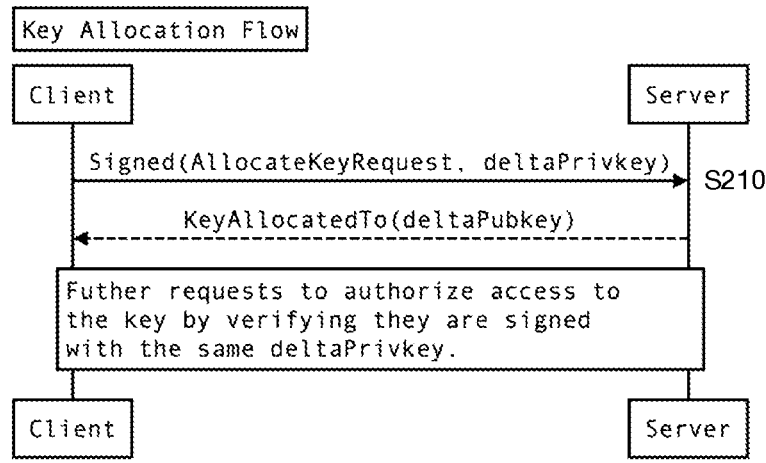
FIG. 6 is a representation of an exemplary key allocation flow, in accordance with variations.

S210 can be performed in response to a key allocation request (e.g., as shown in FIG. 6), when key generation is requested, at a predetermined time, or at any other suitable time. Each instance of S210 is preferably performed for a specific participant group, wherein the participant identities (e.g., participant key sets) and splitting-reconstruction configuration (e.g., t and n for a t of n signing quorum; SSS parameters; etc.) are known before or generated during the key generation ceremony. In variations, S210 includes selecting a participant group that includes n participants. The participant group can be selected at any suitable time (e.g., before or after receiving a key allocation request). In some implementations, a participant group is selected based on one or more of user input, configuration information, or in any suitable manner. In some implementations, a participant group is identified based on a platform account (e.g., associated with the key allocation request). However, S210 can be otherwise performed based on any other suitable data.

In some variations, as shown in FIG. 6, a client system (e.g., external system 104 shown in FIG. 1), sends a request to a system (e.g., issuer 111, message signing system 112) to allocate a message signing private key for a user account associated with the client system (e.g., a cold storage system). In some implementations, the key allocation request is signed by a private authentication key of the client system (e.g., 104). In some variations, in response, the system associates a message signing private key with the client system's authentication public key corresponding to the authentication private key. In some variations, the system can optionally provide the client system with a notification that the message signing keys have been assigned to the authentication public key, provide the client system with the message signing public key, and/or provide any other suitable response. In some variations, further requests to authorize use of the allocated message signing private key are authenticated by verifying that the request is signed with the client system's authentication private key. However, any other suitable process can be used for key allocation.

The method can optionally include generating communication keys (e.g., authentication keys, encryption keys, integrity key, etc.) (e.g., at S222, S223, and S224) used to securely provide the signing secrets (and additional signing data) to participants (via participant systems 114-c), and used to securely provide additional signing data and partial signatures to the message signing message signing system 112. In variants, the generated communication keys generated are used to provide secure broadcast communication between participant systems, and the message signing message signing system 112 (and optionally the issuer system 111). In some implementations, at least a portion of the communication keys are generated during generation of signing secrets S220. However, the communication keys can be generated at any suitable time (e.g., before receiving a message signing request, after receiving a message signing request but before splitting the message signing key into shares, after splitting the message signing key into shares, etc.). In some implementations, the issuer system 111 generates at least a portion of the communication keys (e.g., all or some). However, any suitable system (or combination of systems) can generate the communication keys (e.g., at S222, S223, and S224).

The communication keys can be securely distributed to one or more of the message signing system 112 and participant systems 114a-c in any suitable manner. In some variations, at least a portion of the generated communication keys (e.g., private keys or corresponding public/private key pairs) are injected into one or more HSM (Hardware Security Module) devices. Such HSM devices can then be communicatively coupled (or electrically coupled) to a respective participant system (or the message signing system 112). Additionally, or alternatively, one or more communication keys can be encrypted with an import key to later be imported into the destination system (e.g., participant system, message signing system).

In variants, the generating communication keys includes one or more of generating authentication keys, generating encryption keys, and generating an integrity key.

In some implementations, generating authentication keys S222 includes generating public and private key pairs. In some implementations, S222 includes generating a server authentication key pair that includes a public authentication key ($AK_s$) and a private authentication key ($ak_s$) for the message signing system 112. In some variations, the server's public authentication key ($AK_s$) and private authentication key ($ak_s$) are provided to the message signing system 112. In some implementations, S222 includes generating a participant authentication key pair that includes a public authentication key ($AK_p$) and a private authentication key ($ak_p$) for each participant system p (e.g., 114a-c). In some variations, each authentication key pair that includes the participant system public authentication key ($AK_p$) and the private authentication key ($ak_p$) is provided to the associated participant system p (e.g., 114a-c).

In some variations, generating participant encryption keys S223 includes generating a participant encryption key pair that includes a public encryption key ($ENK_p$) and a private encryption key ($enk_p$) for each participant system p (e.g., 114a-c). In some variations, each participant encryption key pair that includes the participant system public encryption key ($ENK_p$) and the private encryption key ($enk_p$) is provided to the associated participant system p (e.g., 114a-c).

In some variations, generating an integrity key S224 includes generating a key generation (keygen) integrity key. In variants, this keygen integrity key can be used to verify the identify of the system (or systems) that generate the message signing key (or key shares). In a first example, the keygen integrity key identifies the issuer system 111 as the source of the message signing private key (and key shares). In a second example, the keygen integrity key identifies participants used during a distributed key generation ceremony that for generation of the message signing private key (and key shares). In variants, the signing secrets are considered valid if the corresponding ciphertext decrypts using the keygen integrity key. In some implementations, S224 includes generating a key generation integrity key pair that includes a public keygen integrity key ($PK_{KG}$) and a private keygen integrity key ($sk_{KG}$). The keygen integrity key can be generated before or during the key generation ceremony (e.g., and used to encrypt the message signing key shares during the key generation ceremony), or be generated after.

Generating the signing secrets S220 functions to generate signing key shards, each encrypted to a specific participant. In a first variation, the issuer system 111 performs S220. In a second variation, one or more systems perform a distributed process (e.g., an online process) to generate the signing secrets. However, the message signing secrets can be generated in any suitable manner.

Generating signing secrets can include: splitting the message signing key S221 and encrypting the shares S225, but can additionally or alternatively include any other suitable process.

S220 can include S221, which functions to split the message signing key. In a first variant, splitting the message signing key includes splitting the message signing private key (sk) generated at S210. In a second variant, splitting the message signing key includes splitting the expanded private key (epk) generated at S211.

In some variations, the message signing key is split into n shares or shards ($k_1, \ldots, k_n$), wherein t of the n shares are required to recover the message signing key. In variants, the number n is a predefined number (e.g., a configurable number, a hardcoded number, etc.). Additionally, or alternatively, the number n can be specified in a key allocation request (e.g., as shown in FIG. 6) or otherwise determined. The message signing key can be split using Shamir's Secret Sharing (SSS) or another secret sharing algorithm. In a specific example, the Shamir's Secret Sharing process is performed over a finite field modulo a number ($Z_q$), wherein the modulus is an order (q) of the base point (G) of the elliptic curve used to generate the public key (PK). However, the message signing key can be split in any suitable manner.

In some implementations, S221 includes generating signing secret sharing proof for the message signing key shares. The signing secret sharing proof is a set of data that is used to verify that a message signing key share is actually a share of the message signing key. By using the signing secret sharing proof, a recipient of a signing secret (generated at S220) can verify that the share is a valid share for the message signing private key. The proof is preferably generated using VSS, but can alternatively be generated using any other suitable proof algorithm. The proof is preferably generated using the message signing key (sk) or the expanded signing key (epk), but can alternatively be generated using any other suitable data.

The proof can be generated concurrently, before, or after message signing key splitting using the same or different instance of the message signing key. In one example, the signing key (sk or epk) is split into t of n shares and VSS proof with $((k_1, \ldots, k_n) \nabla)=VSS(epk, t, n)$, with the secret signing proof represented as: $\nabla=\{V_j=\alpha_j G\}_{j \in [t]}$.

In some implementations, the Verifiable Secret Sharing process is performed over a finite field modulo a number ($Z_q$), wherein the modulus is an order (q) of the base point (G) of the elliptic curve used to generate the public key (PK). In some implementations, the Verifiable Secret Sharing (VSS) process is a Pedersen's Verifiable Secret Sharing process. In some implementations, the Verifiable Secret Sharing (VSS) process is any suitable type of secret sharing process.

In some implementations, the shares $(k_i, \ldots, k_n)$ are encoded in big-endian bytes as as $s_i=y_i \| x_i$ where y uses a fixed-bit length encoding ranging from [0, q) and x is a single byte which ranges from [1, n+1], wherein "x∥y" represents the concatenation of byte sequences x and y, and wherein q is the order of the base point (G) of the elliptic curve used to generate the public key (PK). However, the shares can be encoded in any suitable manner.

Encrypting the shares S225 functions to encrypt each message signing key share to a specific participant. The shares can be encrypted to a participant in a 1:1, 1:m, or m:1 shares:participants relationship, or any other suitable relationship. In some variations, encrypting the shares at S225 includes encrypting the shares $(k_1, \ldots, k_n)$ generated at S221 to generate encrypted shares $(c_1, \ldots, c_n)$. Each encrypted share $c_i$ is preferably encrypted to a different participant (e.g., wherein the participant group includes n participants), but can alternatively be encrypted to a participant shared with another encrypted share.

Encrypting the shares S225 can include: identifying a participant to encrypt to, determining the participant key set (or public keys thereof) associated with the identified participant, and encrypting the message signing key share using the participant key set.

The participants can be identified in any suitable manner. In some implementations, participants are identified based on one or more of configuration, hardcoded data, or data received via a key allocation request (e.g., the key allocation request shown in FIG. 6).

In variants, identifying participants includes identifying participant systems (e.g., 114a-c) for each identified participant system. Identifying a participant system can include identifying one or more of the following for each participant system: a message signing application endpoint identifier (e.g., an application level identifier that identifies a process running on a participant system), a physical layer network address (e.g., a MAC address), a network layer address (e.g., an IP address), a port number (e.g., a TCP port number), a session identifier, a communication link identifier (for a persistent communication link), a security token, a participant identifier (e.g., user name, login credentials, etc.), an account identifier, and the like. However, participant systems and participants can otherwise be identified.

The participant key set can be: retrieved from storage (e.g., local storage, remote storage), received from the participant, or otherwise determined.

In variants, the participant key set includes at least one of a participant system public authentication key ($AK_p$) a public encryption key ($ENK_p$) for each identified participant.

In some implementations, encrypting the shares includes: for each share, encrypting the share to a participant i using the participant's public authentication key, the participant's public encryption key, the public keygen integrity key ($PK_{KG}$) (e.g., as the sender's authentication key) to generate an encrypted private key share ($c_i$). In some variations, each share is encrypted to a specific participant. In some variations, each share is encrypted to a specific set of participants, wherein encrypting a share to a set of participants includes encrypting the share to each participant in the set of m participants (thereby generating m encrypted versions of the same share). The shares can optionally be encrypted based on additional information, such as an identifier for a key share (e.g., ciphertext type), the public key of the keygen integrity key, the participant's public authentication key, the signing public key, the VSS proof, and/or any other suitable additional information. The additional information can optionally be used to verify or identify the encrypted private key share.

In some implementations, encrypting the shares includes: for each share ($s_i$), encrypting the share by using a public authentication key (e.g, $PK_{KG}$) (e.g., the keygen integrity key) of the sending system sending the share (e.g., the issuer system 111), a public authentication key (e.g, $AK_{pi}$) of the participant receiving the share (e.g., a participant $p_i$ associated with the share), a public encryption key (e.g., $ENK_{pi}$) of the participant, and optionally an a public ephemeral encryption key (e.g., $EK_i$) generated by the sending system. In an example, the aforementioned keys are used to generate an encryption key (e.g., a symmetric key) shared between the sending system and the respective participant. In an example, each share is preferably encrypted to a specific participant using AKE and AEAD, but can be encrypted in any other suitable manner.

In a specific example, generating an encryption key shared between the sending system and the respective participant includes deriving the encryption key by performing an Elliptic-Curve Diffie-Hellman (ECDH) process by using the public keygen integrity key ($PK_{KG}$) as the issuer system 111's public key and by using the public authentication key ($AK_p$) generated for the participant system at S222.

In some implementations, generating an encryption key shared between the sending system and the respective participant is performed as follows:

$DH1=DH(PK_{KG}, ENK_p)$ $DH2=DH(EK_I, AK_p)$ $DH3=DH(EK_I, ENK_p)$ shared encryption key=$KDF(DH1 \| DH2 \| DH3)$ In some implementations, $PK_{KG}$, $ENK_P$, $EK_I$, and $AK_p$ are all public keys known to both the sending system and the respective participant, whereas the private keys corresponding to each of $PK_{KG}$, and $EK_I$ are known only to the sending system, and the private keys corresponding to each of $ENK_p$, and $AK_p$ are known only to the participant (and optionally the system that generates the private keys corresponding to each of $ENK_p$, and $AK_p$).

In some implementations, the sending system (e.g., 111) calculates DH1 by using $ENK_p$ and the private key corresponding to $PK_{KG}$, and the participant system for the participant p, calculates DH1 by using $PK_{KG}$ and the private key of $ENK_p$.

In some implementations, the sending system calculates DH2 by using $AK_p$ and the private key corresponding to $EK_I$, and the participant system for the participant p, calculates DH2 by using $EK_I$ and the private key of $AK_p$.

In some implementations, the sending system calculates $DH_3$ by using $ENK_p$ and the private key corresponding to $EK_I$, and the participant system for the participant p, calculates $DH_3$ by using $EK_I$ and the private key of $ENK_p$.

In some implementations, encrypting the shares includes: for each share ($k_i$), encrypting the share $k_i$ as described herein to generate the share ciphertext ($c_i$), and combining the resultant encrypted share $c_i$ with the associated data (e.g., wherein the associated data can be provided as cleartext). In this variation, the associated data can be included as part of the encryption process, or be appended after $k_i$ encryption.

In some implementations, encrypting the shares includes: for each share ($k_i$), combining the share $k_i$ with associated data, and encrypting the combined data (as described herein) to generate an encrypted share $c_i$.

In some implementations, encrypting the shares includes: for each share ($k_i$), encrypting the share $k_i$ under the shared encryption key (e.g., generated as described herein) to generate an encrypted share $c_i$ (e.g., share ciphertext $c_i$) and combining the encrypted share with associated data.

In some implementations, the associated data includes the public keygen integrity key ($PK_{KG}$) and the participant's authentication key $AK_p$. In some implementations, the associated data includes the signature verification key PK. In some implementations, the associated data includes the signing secret sharing proof (e.g., the VSS proof $\hat{V}$ generated at S221). In some implementations, the associated data includes a participant broadcast round identifier that identifies the secret share as being broadcast to each participant in at least a first broadcast round.

In a specific example, the shares (of the private message signing key) can be encrypted using:

$$c_i = AES(3DH(PK_{KG}, AK_{Pi}, ENK_{P1}), k_i, \text{ciphertext type} \| PK_{KG} \| AK_{Pi} \| PK \| \hat{V})$$

However, $c_i$ can be otherwise generated.

In variants, the signing secrets generated at S220 (e.g., the encrypted shares $c_i$ encrypted at S225, and optionally the associated data) are stored at S226. In some variations, the sending system (e.g., the issuer system 111) stores the encrypted signing secrets (signing key share ciphertext) ($c_i$) (and optionally the associated data) in association with the signature verification key PK generated at S212. Additionally or alternatively, the signing secret ($c_i$) can be stored in association with the respective participant ($p_i$). In some variations, the sending system stores the encrypted signing secrets ($c_i$) at the message signing system 112, or in storage accessible by the message signing system 112. In some variations, the sending system stores the encrypted signing secrets ($c_i$) at a respective participant system $p_i$. The encypted signing secrets ($c_i$) are preferably stored online (e.g., in Internet- or externally-connected storage), but can alternatively be stored offline (e.g., in cold storage, etc.) in geographically distributed storage, or otherwise stored.

In some variations, the sending system stores information at the message signing system 112 that associates a participant system i with a particular share ($c_i$). For example, each encrypted message signing key share ($c_i$) can be stored at the message signing system 112 in association with the public authentication key $AK_p$ associated with the key share ($c_i$). Additionally, or alternatively, the message signing system 112 can store information identifying each participant system with the associated message signing key share ($c_i$). However, message signing key shares ($c_i$) can be associated with participants and/or participant systems 114a-c in any suitable manner, such that during message signing the message signing system 112 can broadcast the message signing key shares ($c_i$) to the appropriate participant systems (e.g., during the first broadcast round). In variants, the message signing system 112 can store information associating an index with each participant, such that the message signing system 112 can identify the index i of a partial signature received from a participant system by based on the authenticated identity of the participant system that provides the partial signature. For example, if the public authentication key $AK_{pi}$ is associated with index i at the message signing system 112, and the partial signature ($s_i$) provided by participant $p_i$ is signed by using the associated private authentication key $ak_{pi}$, then the message signing system can identify the partial signature ($s_i$) as being the $i_{th}$ partial signature, by verifying the signature with the public authentication key $AK_{pi}$.

In variants, the signing secrets ($c_i$) (generated at S220 and stored at S226) can be updated to improve security. For example, to protect against a threat that several of the participant systems have been compromised, the signing secrets can be updated such that any information that an attacker obtains from a compromised system will no longer be useful for message signing. In some variations, to protect against such attacks, the signing secrets can be updated (e.g., re-encrypted to new participant keys; reconstructed, re-split, and re-encrypted; funds transferred to another PK, etc.). The signing secrets ($c_i$) can be updated periodically, in response to detection of a threat, in response to a command, or in response to any suitable trigger or event.

Updating the signing secrets can include accessing (or restoring) the message signing private key generated at S210, and re-splitting the message signing private key into shares as described herein for S221. The shares can be encrypted to a set of participants (as described herein for S225). The set of participants can be the pervious set of participants. Alternatively, the shares can be encrypted to a different set of participants (e.g., a set of participants that excludes participants that are believed to have been compromised). Once encrypted, the encrypted updated shares can be stored at the messaging signing system 112 (as described herein for S226). The old signing secrets can be deleted at the message signing system 112, deprecated, or otherwise excluded from message signing operations. In this manner, the data needed to perform message signing can be updated such that compromised data can be invalidated, without rotating the message signing private key. In this manner, message signing private key can still be used without being rotated. Alternatively, the signing secrets ($c_i$) can be re-encrypted using new participant keys assigned to the participants of the respective participant group. However, the signing secrets ($c_i$) can be otherwise updated.

In variants, the participants can perform proactive secret sharing to protect against security threats (e.g., at S240), without requiring access to the message signing private key.

In some variations, the issuer system 111 performs at least a portion of S221-S226. In some variations, the participant's local system (e.g., user device, HSM, etc.) performs at least a portion of S221-S226.

Figure 8:
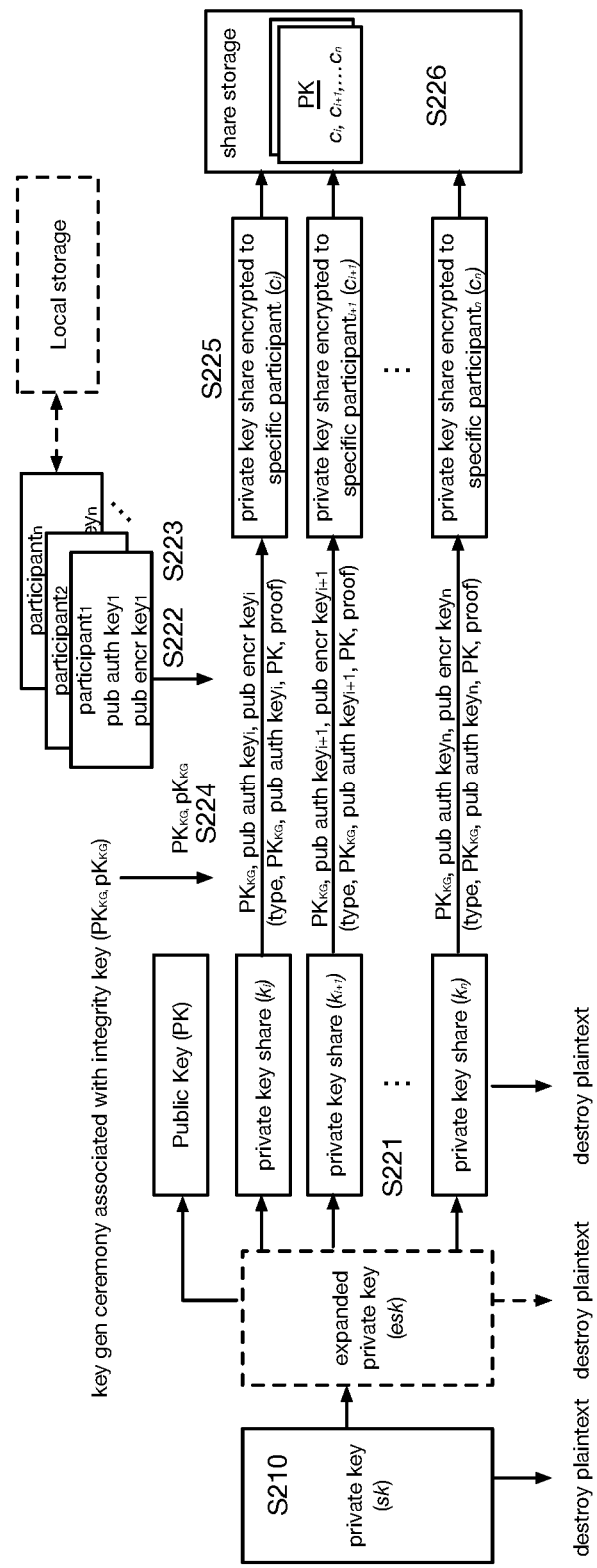
FIG. 8 is a representation of a key generation flow for a single message signing key and participant set, in accordance with variations.

FIG. 8 is an example of a key generation flow for a single message signing key and participant set, in accordance with variations. As shown in FIG. 8, the expanded private key (esk) is split (S210), authentication keys (S222) and encryption keys (S223) are generated for a plurality of participant systems, the private key shares are encrypted to specific participants (S225), and the encrypted private key shares are stored (S226). The private key shares can optionally be encrypted to (or otherwise associated with) the key generation ceremony instance via an integrity key for the key generation ceremony.

Figure 7:
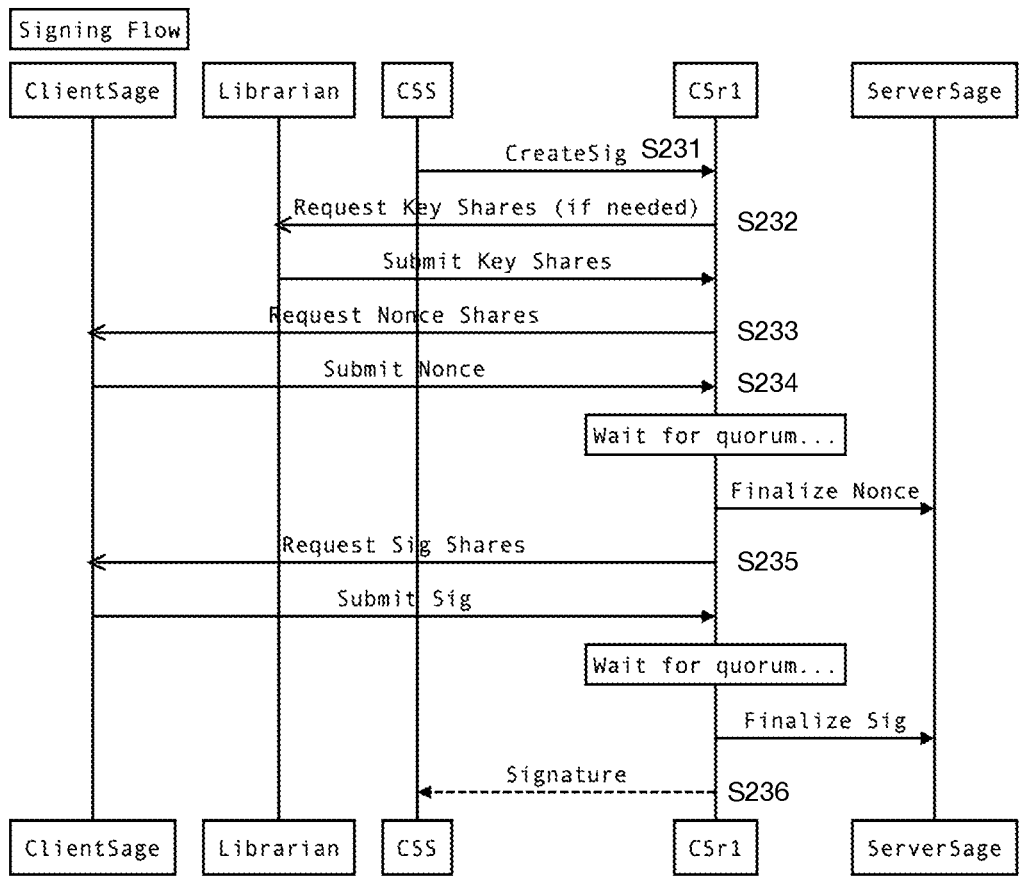
FIG. 7 is a representation of an exemplary signing flow, in accordance with variations.
Figure 9:
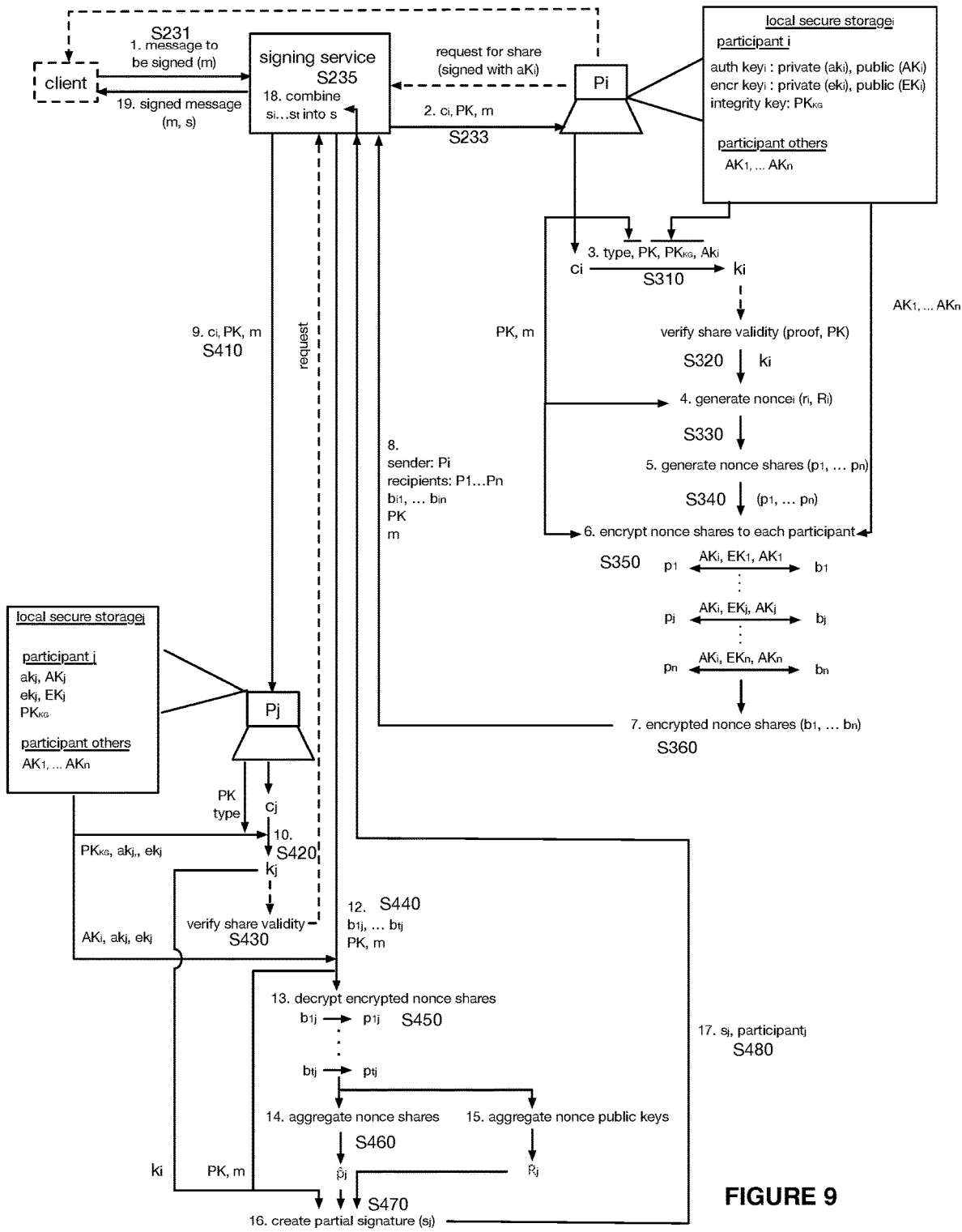
FIG. 9 is a representation of a message signing flow for a single message, using a single message signing key, in accordance with variations.

Processing a signing request by using the stored signing secrets S230 functions to cooperatively generate a signature for a message in a distributed manner. FIG. 7 is a representation of an exemplary signing flow, in accordance with variations. FIG. 9 is a representation of a message signing flow for a single message, using a single split (or sharded) message signing key, in accordance with variations.

Figure 11:
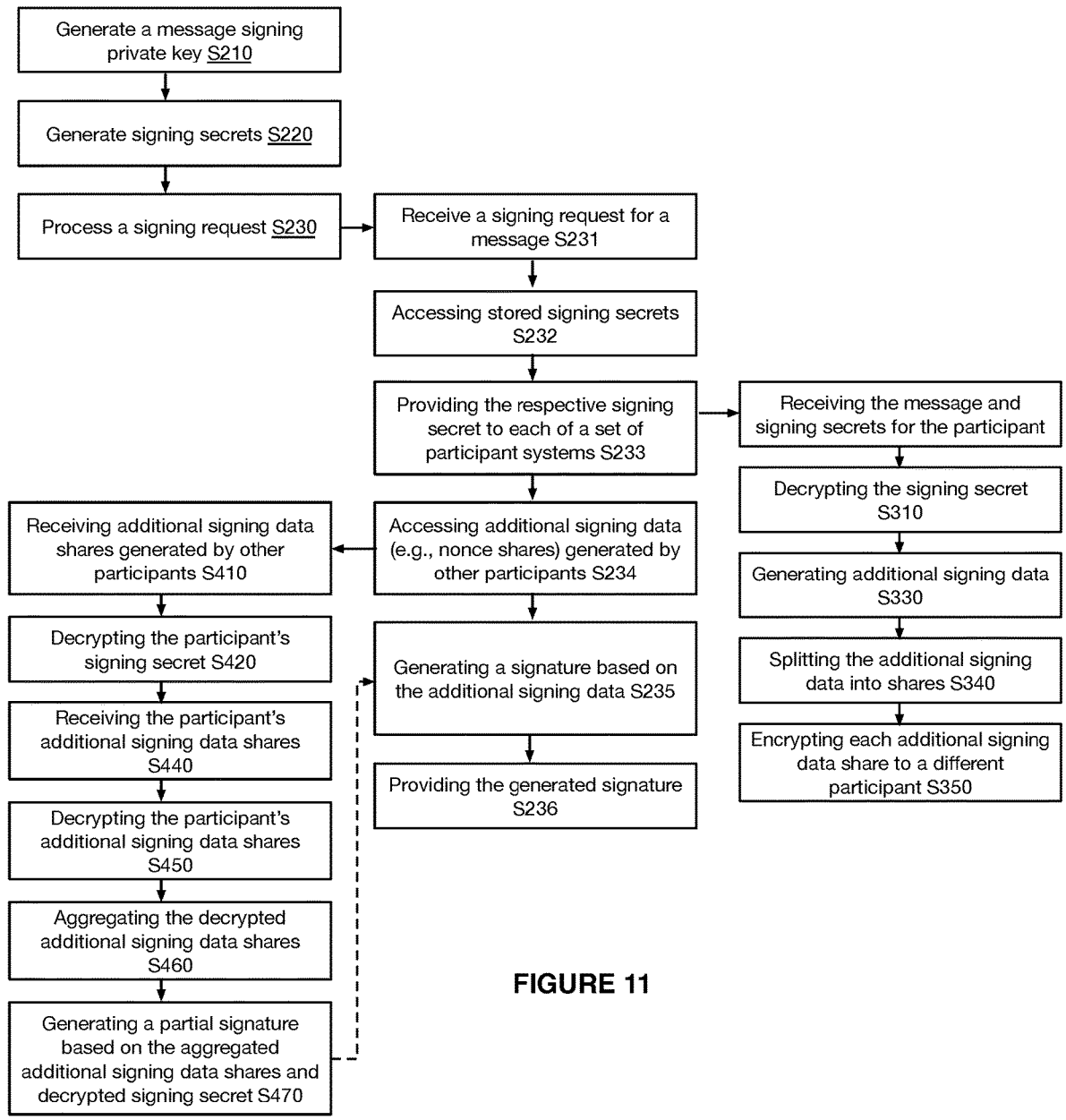
FIG. 11 is a flowchart representation of an example of the method.

As shown in FIG. 11, processing the signing request S230 can include one or more of: receiving a signing request for a message S231; accessing stored signing secrets S232; providing the respective signing secret to each of a set of participant systems S233; accessing additional signing data (e.g., nonce shares) generated by other participants S234; generating a signature based on the additional signing data (e.g., encrypted to the receiving participant) S235, and providing the generated signature S236.

Figure 3:
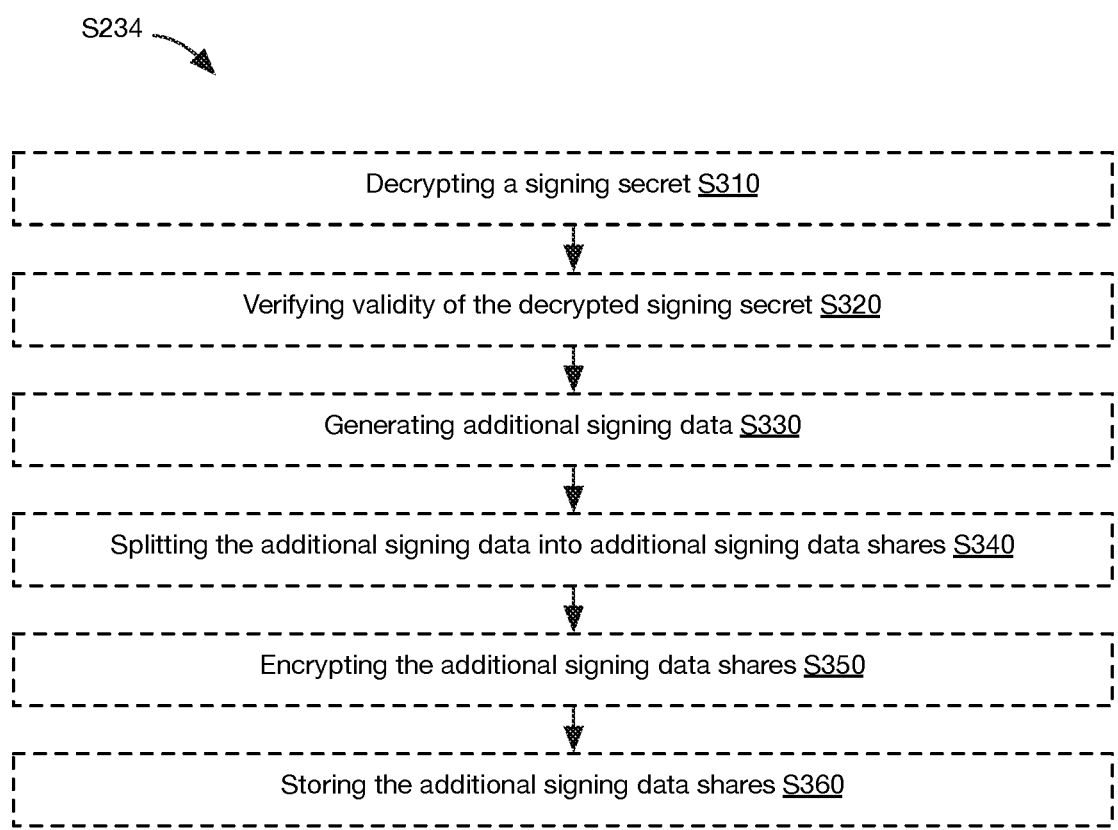
FIG. 3 is a representation of a method, in accordance with variations.
Figure 4:
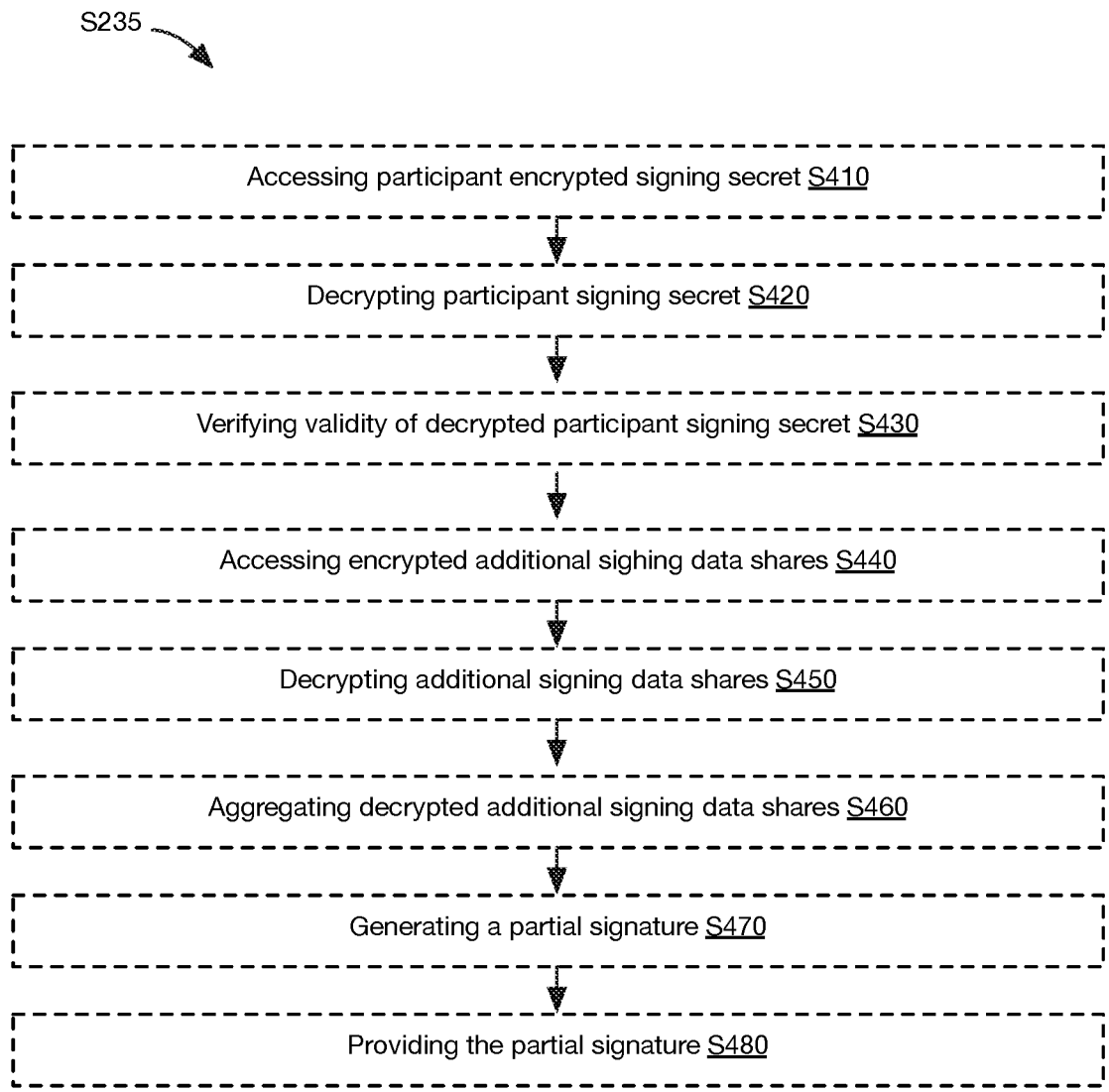
FIG. 4 is a representation of a method, in accordance with variations.

Additionally or alternatively, processing the signing request S230 can include: optionally receiving a signing notification; requesting the message and the encrypted signing secrets encrypted to the participant; decrypting the encrypted signing secret S310; optionally verifying the validity of the signing secret and aborting if validation fails S320; generating additional signing data S330; splitting the additional signing data into additional signing data shares S340; encrypting each additional signing data share to a different participant (e.g., of the participant group) S350; and storing the additional signing data shares S360 (e.g., at the message signing system 112) as shown in FIG. 3. Processing the signing request S230 can additionally or alternatively include: after a first quorum of additional signing data has been reached, at a participant system of the participant group: accessing the participant's the encrypted signing secret $c_i$ (S410); decrypting the participant's encrypted signing secret $c_i$ (S420); verifying the validity of the signing secret (aborting if validation fails) (S430); accessing the additional signing data shares $b_{ij}$ encrypted to the participant system $p_j$ by the one or more other participant systems $p_i$ (S440); decrypting each encrypted additional signing data share $b_{ij}$ (S450); aggregating the decrypted additional signing data shares (e.g., $nonce_{ij}$) (S460); generating a partial signature by using the decrypted additional signing data shares ($nonce_{ij}$) (S470); and optionally providing the partial signature (e.g., to the message signing system 112) (S480), as shown in FIG. 4, wherein a threshold number of partial signatures are aggregated into a valid signature in S235.

However, the signing request can be otherwise processed. All or a portion of S230 can be performed by the message signing system 112 (e.g., S231-236), a participant system (e.g., S310-S360, S410-S480), and/or any other suitable system.

Receiving the signing request S231 functions to receive a request to sign a message (m). The signing request can be received by the message signing system 112, a participant system 114, and/or any other suitable system. The signing request can be received from an external system (e.g., 104) via the API system 113, from a client of the message signing system 112, be generated by the message signing system 112, or received from any other suitable endpoint. The external system can be a digital wallet, a cold storage computing system (CSS), or any suitable type of system. The signing request can include or identify: a message m to be signed, the signature verification key (PK) (e.g., such that the request is a request for a signed message that can be verified by the signature verification key (PK)), the blockchain that the message should be sent to, an expiration time, other metadata (e.g., message source, message generation time, etc.), and/or any other suitable information.

S232 functions to access stored encrypted signing secrets ($c_i$) that are associated with the signing request. In some implementations, the message signing system 112 stores signing secrets for a single signature verification key PK, and all signing secrets stored by the message signing system 112 are associated with the single verification key PK. In some implementations, the message signing system 112 stores signing secrets for a plurality of signature verification keys (PK), the signing system 112 stores signing secrets in association with a respective verification key PK; accessing the stored signing secrets includes accessing the signing secrets stored in association with a signature verification key PK identified in the signing request.

S232 functions to access signing secrets for the signing request received at S231. In some variations, each signing secret $c_i$ is encrypted to a participant $p_i$, and for each signing secret $c_i$ the server stores participant information for the related participant system (e.g., 114a-c) with the signing secret $c_i$. In some implementations, the message signing system 112 uses the stored participant information to provide each signing secret $c_i$ to the participant system of the respective participant $p_i$.

In some variations, S233 includes, for each signing secret corresponding to the signing request, providing the signing secret $c_i$ to respective participant system $p_i$ along with the signature verification key PK and the message m associated with the signing request. In some implementations, the message signing system 112 provides each signing secret $c_i$ to the respective participant system in a payload signed with the server's private authentication key ($ak_s$) (generated at S222). In some implementations, providing the signing secrets to the participant systems at S233 is a first broadcast round (e.g., signing round) in the signing process that includes a plurality of broadcast communication rounds for sending data from the message signing system to the participant systems.

In some variations, the signing secret sharing proof (e.g., VSS proof) for the signing secret is provided to the participant system along with the signing secret. In some variations, the additional information for the signing secret is provided to the participant system along with the signing secret. In some variations, the index i for the signing secret is provided to the participant system along with the signing secret.

Participant systems 114a receiving signing secrets at S233 can include: participant systems managed by humans, and participant systems managed by server(s) of the signing system 110 (e.g., server participants; system servers functioning as participants and holding participant authentication keys and/or participant encryption keys; etc.), and/or participant systems managed by any other suitable entity or system. The server participants can be: centralized, distributed, or otherwise related. In some variations, a total number of human-managed participant systems (h) is selected; a minimum number of required human-managed participant systems (q) is selected (wherein h>=q); a number of server-managed participant systems (s) is calculated based on h and q; a minimum number of shares (t) to reconstruct the message signing private key is calculated based on q and s; and the total number of shares (n) is calculated based on h and s.

In some variations, s is calculated as follows: s=h−q+1.
In some variations, t is calculated as follows: t=q+s.

In some variations, n is calculated as follows: n=h+s.

However, s, t, and n can be otherwise determined. Variants of the system and method using server participants can automatically determine: the number of server participants, shares required to reconstruct, and the total number of shares required (e.g., based on the number of human participants and user-specified or automatically determined quorum); and can optionally automatically split the message signing key (e.g., in S220) and/or generate authentication and encryption keys for the human and server participants based on the automatically determined values above.

S234 functions to access additional signing data generated by at least t of n participants. The additional signing data is preferably data related to a nonce (e.g., a nonce share), but can alternatively be related to a cryptographic seed or any other suitable additional signing data required by the signing protocol. In variants, one or more participant systems generates a portion of the additional signing data (e.g., an additional signing share) by using information sent to the participants by the message signing system 112 in the current broadcast round (e.g., the encrypted share $c_i$, the decrypted share $s_i$, the signature verification key, the key share secret sharing proof, the message to be signed, etc.). Participant systems can generate the additional signing data in response to user input (e.g., input identifying user authorization), or automatically (without requiring user input to authorize generation of the additional data).

In some variations, a participant system for participant $p_i$ generates additional signing data (e.g., a nonce share) by using the signing secret $c_i$, signature verification key PK, and the message m provided by the server 111 at S233. In variants, a random nonce seed is also used to generate the additional signing data. Any set of t of n participants can perform nonce generation.

In some implementations, a participant system for participant $p_i$ generates additional signing data by using a signed payload received from the message signing system 112. The signed payload is signed by the message signing system's private authentication key ($ak_s$) (generated at S222) and includes the signing secret $c_i$, signature verification key PK, and the message m (and optionally the additional information and/or a key share secret sharing proof). In some implementations, the participant system for $p_i$ verifies that the payload's signature is valid by using the server's public authentication key ($AK_s$) (generated at S222). If the signature is invalid, $p_i$ aborts the message signing process.

Generating the additional signing data can include at least one of, by a participant system $p_i$: decrypting the encrypted signing secret $c_i$ (S310); optionally verifying the validity of the signing secret (aborting if validation fails) (S320); generating additional signing data (S330); splitting the additional signing data into additional signing data shares (S340); encrypting the additional signing data shares (S350); and storing the additional signing data shares (S360), as shown in FIG. 3. However, additional signing data can be otherwise determined. In some implementations, storing the additional signing data shares (S360) includes storing the encrypted nonce shares $b_{ij}$ at the message signing system 112. In some variations, steps S310-S360 are performed by a participant system 114. This process is preferably performed by at least t participant systems (e.g., concurrently, within a predetermined time threshold), but can alternatively be performed by less. However, S310-S360 can otherwise be performed.

Decrypting a signing secret S310 with a participant system form can include decrypting the encrypted signing secret by using the private authentication key ($ak_{pi}$) for the public authentication key ($AK_{pi}$) associated with the encrypted signing secret (e.g., identified by the associated data for the signing secret). In variants, participant system for $p_i$ uses one or more of the participant Pi's private signing key ($enk_{pi}$), the public keygen integrity key $PK_{KG}$, and/or a public issuer ephemeral key ($EK_I$) to decrypt the encrypted signing secret.

Decrypting a signing secret S310 can include deriving the shared encryption key used at step S225 (e.g., using AKE) and using the derived encryption key to decrypt the signing secret. In some variations, the decrypted signing secret includes a message signing key share generated at S221. In some variations, S310 includes accessing the key share secret sharing proof generated at S221, and using the key share secret sharing proof to verify the decrypted signing secret (e.g., to verify that the share is in fact a share of the message signing private key). In some variations, the decrypted signing secret includes the additional information for the signing secret.

In some variations, deriving the shared encryption key includes: calculating DH1 by using $PK_{KG}$ (stored in a trusted data source accessible to the participant system) and the private key of $ENK_p$ (which is securely stored for the participant system); calculating DH2 by using $EK_I$ (stored in a trusted data source accessible to the participant system) and the private key of $AK_p$ (which is securely stored for the participant system); calculating DH3 by using $EK_I$ and the private key of $ENK_p$; generating a byte sequence by concatenating DH1||DH2||DH3; and deriving the encryption key as a result of KDF(DH1||DH2||DH3).

In some variations, key share secret sharing proof is a VSS proof, and verifying the validity of the signing secret (S320) includes verifying the VSS proof ($\nabla=\{V_j=a_jG\}_{j\in[t]}=\{a_0G, a_1G \ldots, a_{t-1}G\}$) for the decrypted signing secret. In some variations, each Vj of the VSS proof is a commitment value, and each $a_j$, is the j-th coefficient of the sharing polynomial used for splitting the message signing key into shares and G is the base point of the elliptic curve used to generate the signature verification key. In some variations, verifying the validity includes verifying the signing secret $k_i$ by checking the equality for $j \in [t]$:

$$k_iG = \Sigma_{j=0}^{t-1} V_j \cdot i^j = (a_0 G \cdot i^0) + (a_1 G \cdot i^1) + \ldots + (a_{t-1} G \cdot i^{t-1})$$

, wherein values for $a_0G, a_1G \ldots, a_{t-1}G$ are provided by the VSS proof, and wherein i is the index of the signing secret that is associated with the participant system (e.g., by information stored at the message signing system 112, and optionally provided by the message signing system 112 to the participant system). In some variations, verifying the validity includes verifying that the signature verification key PK equals the free-coefficient commitment $V_{j,o}$ in $\nabla_j$.

In a first variation, generating additional signing data (S330) includes: generating a random number (e.g., a nonce).

In a second variation, generating additional signing data (S330) includes: generating the data by performing a distributed key generation process.

In a third variation, generating additional signing data (S330) includes: generating the additional signing data based on the signing secret $k_i$ and/or the signing secret with additional info. In a specific example, the additional signing data is generated by: generating a random nonce seed (e.g., a 32-bit nonce seed, generated using $r_i \leftarrow^\$ \{0, 1\}^{32}$), and calculating the nonce:

$r_i$=HKDF(signing secret||nonce seed,broadcast round identifier||PK||m)

wherein the broadcast round identifier (e.g., "2") can be different from the message signing key broadcast round identifier (e.g., "1'). In variants, the broadcast round identifier identifies the broadcast round in which the generated additional signing data is broadcasted from the message signing system to other participant systems.

In some variations, generating additional signing data (S330) includes: generating a nonce public key pair that includes a generated nonce and a nonce public key R. In some implementations, generating the nonce public key R includes performing scalar multiplication of the nonce nonce by the base point G used to generate the signature verification key (at S212) (e.g., R=nonceG).

In some variations, generating additional signing data (S330) includes: generating a random number, and multiplying the random number by one of two challenges to produce a nonce.

In some variations, a subset of participants (of the set of participants) each generate a different additional signing data (e.g., based on the decrypted key share $k_i$, based on the message m, etc.), wherein the respective additional signing data share ($r_i$) is encrypted to each participant ($p_j$) of the set of participants to generate an encrypted additional signing data share ($b_j$)) for each participant of the set of participants ($b_1, \ldots, b_n$), associated with the respective additional signing data share. In variants, the additional signing data is generated based on a secure distributed key generation protocol (e.g., such that the additional signing data generated by different participants within the same participant set are related), but can be generated using any other suitable method. The additional signing data can be: randomly generated, generated using a Monte Carlo method (e.g., LDS method), deterministically generated, or otherwise generated.

In some variations, the additional signing data (e.g., $r_i$) is split into shares (e.g., nonce shares). The additional signing data is preferably split using the same t of n configuration as that used for message signing key splitting (e.g., wherein the splitting configuration can be predetermined or sent to the participants), but can be otherwise split. For example, splitting the additional signing data into shares (S340) includes splitting the additional signing data into n shares (e.g., $nonce_i, \ldots, nonce_n$), wherein t of the n shares are required to recover the message signing key (as described herein for S221). In some variations, splitting the additional signing data into shares (S340) includes generating a signing secret sharing proof that can be used to verify that the shares are in fact shares of the additional signing data. In variants, the proof is a VSS proof generated by a VSS process used to split the additional signing data into n shares ($nonce_i, \ldots, nonce_n$) (as described above, such as for S221).

In some variations, encrypting the additional signing data shares (S350) includes: for each participant system for a participant $P_i$, encrypting the associated additional signing data share (e.g., $nonce_j$) to participant $P_j$. In some implementations, encrypting the shares includes: for each share ($p_i$), encrypting the share by using a public authentication key (e.g., $AK_{Pi}$) of the sending system sending the share (e.g., participant $P_i$), a public authentication key (e.g., $AK_{Pj}$) of the participant receiving the share, a public encryption key (e.g., $ENK_{Pj}$) of the receiving participant, and optionally a public ephemeral encryption key (e.g., $EK_{Pi}$) generated by the sending participant $P_i$. In an example, the aforementioned keys are used to generate an encryption key (e.g., a symmetric key) shared between the sending participant and the respective participant.

In some implementations, encrypting the shares includes: for each share ($p_i$), encrypting the share by using a shared encryption key. In some variations, the participant system $P_i$ generating the additional signing data share derives a shared encryption key for encrypting the data to a participant system $P_j$ by: calculating DH1 by using the private key of $AK_{pi}$ (the authentication key of participant system $P_i$) and $ENK_{pj}$ (the public encryption key for participant system $P_j$); calculating DH2 by using the private key of $EK_{pi}$ (the ephemeral key for participant system $P_i$) and $AK_{pj}$ (the authentication key of participant system $P_j$); calculating $DH_3$ by using the private key of $EK_{pi}$ and $ENK_{pj}$; generating a byte sequence by concatenating $DH1\|DH2\|DH_3$; and deriving the encryption key as a result of $KDF(DH1\|DH2\|DH_3)$.

In some implementations, encrypting the additional signing data shares includes: for each share (e.g., $nonce_i$), encrypting the share (e.g., $nonce_i$) with the shared encryption key (e.g., generated at S350), and combining the resultant encrypted share $b_j$ with the associated data (e.g., wherein the associated data can be provided as cleartext). In this variation, the associated data can be included as part of the encryption process, or be appended after encryption.

In some implementations, encrypting the additional signing data shares includes: for each additional signing data share (e.g., $nonce_i$), combining the share (e.g., $nonce_j$) with associated data, and encrypting the combined data under the shared encryption key (e.g., generated at S350) to generate an encrypted share $b_j$.

In some implementations, encrypting the shares includes: for each share (e.g., $nonce_i$), encrypting the (e.g., $nonce_j$) under the shared encryption key (e.g., generated at S350) to generate an encrypted share $b_j$, and combining the encrypted share with associated data.

The associated data can include: the ciphertext type (e.g., nonce), $AK_{pi}$ (the authentication key of participant system $P_i$) and $AK_{pj}$ (the authentication key of participant system $P_j$), the signature verification key PK, the message m, the signing secret sharing proof generated at S340, and/or any other suitable information.

Each encrypted share $b_{ij}$ is generated by the participant system $p_i$ for each participant system $p_j$. In one example, the encrypted nonce share is generated using:

$$b_{ij} = AES(3DH(AK_{Pi}, AK_{Pj}, EK_{Pj}), r_{ij}, 2\|AK_{Pi}\|AK_{Pj}\|PK\|m\|\hat{V})$$

In some implementations, storing the additional signing data shares (S360) includes storing the encrypted additional signing data shares $b_{ij}$ at the message signing system 112 (e.g., sending the additional signing data shares $b_{i1} \ldots b_{in}$ to the message signing system 112 for storage). All shares are preferably uploaded (e.g., including the share encrypted to the generating participant ($b_{ii}$); alternatively, only shares encrypted to other participants are uploaded.

In some implementations, the server S112 stores each encrypted nonce shares $b_{ij}$ in association with the corresponding message m and signature verification key PK.

In some implementations, S360 includes the participant system $p_i$ signing a payload that includes the additional signing data shares, the signed payload being signed by the participant system's private authentication key ($ak_{pi}$) (generated at S222). In some implementations, the message signing system 112 verifies that the payload's signature is valid by using the participant system $p_i$'s public authentication key ($AK_{pi}$) (generated at S222).

In some implementations, after accessing (and optionally authenticating) additional signing data shares generated by a threshold number (e.g., t, quorum) of participants (at S234 shown in FIG. 2D), a broadcast round begins (e.g., second broadcast round).

Figure 2D:
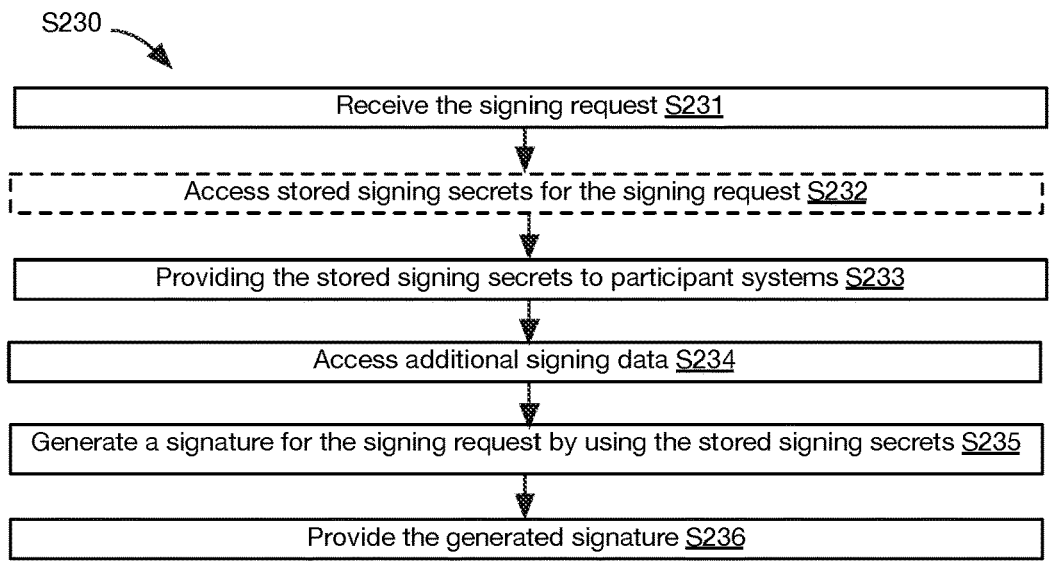

Reverting to FIG. 2D, generating a signature S235 functions to generate a signature for the signing request (received at S231) by using the stored signing secrets.

In some variations, the signature is an Ed25519 signature. In some implementations, the signature is a signature in accordance with an EdDSA signature scheme. In some implementations, the signature is parameterized to SHA-512 and Curve 25519. However, the signature can be any suitable type of signature, including, but not limited to, a Boneh-Lynn-Shacham (BLS) signature, a Schnorr signature, and the like.

In some variations, S235 includes two or more participant systems producing partial signatures for the message identified in the signing request. In some implementations, since the message signing private key is split into n shares, t of which are needed for signing, at least t participant systems must produce partial signatures. The set of participant systems that provide partial signatures for the message signing can be a different set of participant systems that generate a nonce at S330.

In a first variation, generating partial signatures is performed after a first broadcast round (e.g., a first round in which the encrypted signing secrets are broadcasted by the message signing system to each participant system). In a second variation, generating partial signatures is performed after two or more broadcast rounds. In each broadcast round prior to the partial signature generation round, one or more participant systems receive data from the message signing system 112, generates data (e.g., using the data provided by the message signing system 112 in the current round, or in previous rounds), and provided the data generated by the participant system in that round to the message signing system. This data can then be broadcasted by the message signing system 112 to all the other participant systems in the signature generation round, or in a further data generation round. In variants, the number of rounds can be based on security constraints, signature protocol requirements, usability constraints, efficiency constraints, and network connectivity constraints, and any other suitable type of constraint.

In some variations, S235 includes the message signing system 112 initiating a second broadcast round by providing to each participant system $p_i$: the message to be signed m; the signature verification key (PK); their respective encrypted signing secret $c_i$ and the encrypted additional signing data shares $b_{ij}$ encrypted to the participant $p_i$ (by the participant system for $p_i$ and each of the other participants $p_j$). Alternatively, the second broadcast round can be initiated by a participant or another system. In some implementations, at S235 the message signing system 112 provides the message m, the signature verification key (PK), and their respective encrypted signing secret $c_i$ to the participant system for $p_i$ in a payload signed by the message signing system's private authentication key ($ak_s$) (generated at S222). In some implementations, each participant system verifies that the payload's signature is valid by using the server's public authentication key ($AK_s$) (generated at S222) (S410 shown in FIG. 4). In some variations, the encrypted additional signing data shares $b_{ij}$ are included in the signed payload.

In some variations, generation of a partial signature by a participant system for $p_i$ can be performed in response to user input (e.g., input identifying user authorization), or automatically (without requiring user input to authorize generation of the a partial signature).

In some variations, generation of a partial signature by a participant system for $p_i$ includes at least one of: accessing the participant's the encrypted signing secret $c_i$ (S410); decrypting the participant's the encrypted signing secret $c_i$ (S420); verifying the validity of the signing secret (aborting if validation fails) (S430); accessing the additional signing data shares $b_{ij}$ encrypted to the participant system $p_i$ by the participant system $p_i$ and each of the other participants $p_j$ (S440); decrypting each encrypted additional signing data share $b_{ij}$ (S450); aggregating the decrypted additional signing data shares (e.g., $nonce_{ij}$) (S460); generating a partial signature by using the decrypted additional signing data shares ($nonce_{ij}$) (S470); and providing the partial signature (e.g., to the message signing system 112) (S480), as shown in FIG. 4. In some variations, steps S410-S480 are performed by a participant system 114. This process is preferably performed by at least t participant systems (e.g., concurrently, within a predetermined time threshold), but can alternatively be performed by less. The t participant systems generating the partial signatures can be the same as or different from the participant systems generating the nonce.

Decrypting the participant's encrypted signing secret $c_i$ (S420) includes decrypting the encrypted signing secret $c_i$ (e.g., using AKE; as described herein for S310; etc.).

Verifying the validity of the signing secret (aborting if validation fails) (S430) includes: verifying the validity of the signing secret (e.g., using VSS; as described herein for S320; etc.).

Accessing the additional signing data shares $b_{ij}$ encrypted to the participant system $P_i$ by the participant system $P_j$ (S440) functions to fetch at least t additional signing data shares (e.g., nonce share ciphertexts, encrypted nonce shares), each generated by a different participant (e.g., inclusive or exclusive of the instantaneous participant $P_i$). The additional signing data shares can be retrieved from the message signing system 112, from the other participants, and/or any other suitable source. The additional signing data shares can be retrieved or received: after signing secret validation; in response to a request to the message signing system; with the encrypted signing secret; and/or at any other suitable time.

Decrypting each encrypted additional signing data share $b_{ij}$ (S450) with a participant system for $P_i$ includes decrypting the encrypted additional signing data share by using the private authentication key ($ak_{pi}$) for the public authentication key ($AK_{pi}$) associated with the encrypted signing secret (e.g., identified by the associated data for the signing secret). The participant system for $P_i$ can additionally or alternatively use one or more of the participant $P_i$'s private encryption key ($enk_{Pi}$), the public authentication key ($AK_{Pj}$) associated with the participant generating the encrypted data, and a public participant ephemeral key ($EK_j$) (associated with the participant generating the encrypted data) to decrypt the encrypted data at S450.

Decrypting additional signing data share $b_{ij}$ can include deriving the shared encryption key used at step S350 and using the derived encryption key to decrypt the encrypted additional signing data share $b_{ij}$. The shared encryption key can be derived based on $b_{ij}$'s associated data (e.g., ciphertext type, $AK_{sender}$, $AK_{recipient}$, PK, m, proof, etc.), and/or other data.

In some variations, the encrypted additional signing data share $b_{ij}$ includes the additional signing data share (e.g., $nonce_{ij}$) generated at S340. In some variations, the signing secret sharing proof generated at S340 is provided with the encrypted additional signing data share $b_{ij}$.

In some variations, deriving the shared encryption key used at S350 includes: calculating DH1 by using $AK_{pj}$ (the public authentication key of participant system $p_j$) and the private key of $ENK_{pi}$ (the encryption key of the participant system $p_i$); calculating DH2 by using $EK_{pj}$ (the public ephemeral key of the participant system $p_j$) and the private key of $AK_{pi}$ (the authentication key of the participant system $p_i$); calculating DH3 by using $EK_{pj}$ and the private key of $ENK_{pi}$; generating a byte sequence by concatenating DH1||DH2||DH3; and deriving the shared encryption key as a result of KDF(DH1||DH2||DH3).

In some variations, S450 includes, for each additional signing data share (e.g., $nonce_{ij}$), verifying the validity of the additional signing data share by verifying the signing secret sharing proof included along side the decrypted nonce. This is preferably performed after additional signing data share decryption, but can alternatively occur before. In variants, the signing secret sharing proof is a VSS proof ($\nabla = \{V_k = a_k G\}_{k \in [t]} = \{a_0 G, a_1 G \ldots, a_{t-1} G\}$). In some implementations, each $V_k$ of the VSS proof is a commitment value, and each $a_k$ is the k-th coefficient of the sharing polynomial used for splitting the additional signing data (e.g., $nonce_j$) into shares ($nonce_{ij}$) and G is the base point of the elliptic curve used to generate the nonce public key. In some variations, verifying the validity includes verifying the additional signing data share by checking the equality for k $\in [t]$:

$$nonce_{ij} G = \Sigma_{k=0}^{t-1} V_k \cdot i^k = (a_0 G \cdot i^0) + (a_1 G \cdot i^1) + \ldots + (a_{t-1} G \cdot i^{t-1})$$

, wherein values for $a_0 G, a_1 G \ldots, a_{t-1} G$ are provided by the VSS proof, and wherein i is the index of the additional signing data share (e.g., $nonce_j$) that is associated with the participant system (e.g., by information stored at the message signing system 112, and optionally provided by the message signing system 112 to the participant system). Verifying the validity can optionally include verifying that there are no duplicate VSS proofs.

In some variations, verifying the validity includes the participant system $P_i$ verifying that t additional signing data shares (e.g., t nonce share ciphertexts) have been provided to the participant system $P_i$.

In some variations, verifying the validity includes verifying that there are no two additional signing data shares have the same sender public authentication key ($AK_{pj}$) (e.g., each share should be from a different participant system, and if authentication information indicates that one participant system generated two or more of the receive nonce shares, then the process should be aborted).

In some variations, verifying the validity includes verifying that all additional signing data shares have the participant system's public authentication key ($AK_{pi}$) as the recipient authentication key (meaning that all received additional signing data shares were intended for the participant system $p_i$).

In some variations, if any verification step fails, the process is aborted. On the other hand, if verification is successful, the verified and decrypted additional signing data shares (one from a different participant system) are aggregated at S460.

Aggregating the decrypted additional signing data shares (e.g., $nonce_{ji}$) (S460) functions to generate an aggregated additional signing datum for partial signing. The aggregated additional signing datum is preferably specific to $P_i$, but can alternatively be shared between participants. The aggregated additional signing datum is preferably different from the additional signing data generated in S330, but can alternatively be the same. Aggregating the additional signing data shares (e.g., decrypted nonce shares) can include calculating the aggregated signing data shares according to:

$$\hat{p}_i = \Sigma_{j=0}^{t-1} p_j (\bmod q)$$

where $\hat{p}_i$ is the aggregated additional signing datum for $P_i$ (e.g., aggregated nonce), and $p_j$ is the additional signing data share from each $P_j$ that was encrypted to $P_i$. However, the aggregated additional signing datum can be otherwise determined.

Aggregating the decrypted additional signing data shares can optionally include aggregating the public keys of the additional signing data shares. In one example, this includes aggregating the nonce share public keys R. In a specific example, R can be determined using:

$$R = \Sigma_{j=0}^{t-1} R_j$$

where $R_j$ is the public key for the additional signing data share from each $P_j$. In a specific example, S460 can output the tuple ($k_i$, $\hat{p}_i$, R, PK), which can be used for partial signature generation.

Generating the partial signature S470 functions to generate pieces of the signature that are invalid in isolation but become valid under PK (e.g., for m) once a threshold of partial signatures (e.g., t partial signatures) are combined. S470 is preferably performed by participant system $p_i$, but can be generated by other systems. The partial signature is preferably generated based on the aggregated additional signing datum (e.g., the aggregated nonce), the public aggregated additional signing data key (R), PK, the message, the decrypted signing secret (e.g., decrypted signing key share $k_i$), and/or other data. The partial signature is preferably generated after the aggregated additional signing datum is generated (e.g., immediately after, after a delay), but can alternatively be generated: after the other participants have generated their respective aggregated additional signing datum, after a predetermined event occurrence, and/or at any suitable time. In a specific example, each participant $P_i$ within the second participant set (e.g., each participant of t participants, part of the second quorum, part of the second broadcast round) calculates $s_i := \hat{p}_i + SHA512(R\|PK\|m) \cdot k_i \pmod{q}$, wherein q is the order of the base point G used to generate the signature verification key PK, and determines the partial signature as $\sigma_i := R\|s_i$, wherein the partial signature ($s_i$) can be uploaded to the message signing system 112 with an identifier for $P_j$. However, the partial signatures can be otherwise generated.

In variants, several broadcast rounds are performed to generate a signature, and in each round the message signing system 112 broadcasts information to each participant system. In some implementations, after at least a predetermined number (e.g., t, the number of partial signatures required to generate a signature) of participants return additional signing data to the message signing system 112, the message signing system initiates another broadcast round (e.g., to receive further additional signing data from the participant systems, or to receive partial signatures from the participant systems). In some implementations, additional signing data generated in at least one of the broadcast rounds is used to generate the partial signatures.

In variants, the participant system $p_i$ generates a partial signature S470 by signing the message (to be signed) by using the signing secret decrypted at S310 and the aggregated additional signing data shares (e.g., nonce shares $nonce_{ji}$)

At S480, the participant system $P_i$ provides the generated partial signature to the message signing system 112. In variants, the participant system $P_i$ provides the partial signature in a signed payload that is signed by the participant system's private authentication key ($ak_{pi}$) (generated at S222). In some implementations, the message signing system 112 verifies that the payload's signature is valid by using the participant system $P_i$'s public authentication key ($AK_{pi}$) (generated at S222). In some variations, the signed payload also includes the aggregated nonce public key R.

Generating a signature based on the additional signing data S235 functions to generate a valid signature out of the partial signatures. S235 can include aggregating the t partial signatures received from the participant systems, which functions to generate a signature that verifies under signing public key PK. S235 can be performed by the message signing system 112 (e.g., wherein the message signing system 235 receives partial signatures from t participant systems), by a participant system, and/or any other system. In some variations, aggregating the t partial signatures includes aggregating the partial signatures together as Shamir Shares. In some variations, the message signing system 112 stores information associating each message signing key share index i with a participant system, and the key share index i is used to aggregate the partial signatures using the Shamir Sharing reconstruction process as shown below:

$$s = \sum_{i=0}^{t-1}$$

$$s_i = \prod_{j=0, \neq}^{t-1}$$

$$\frac{x_j}{x_j - x_i} = r + c \cdot sk$$

In some variations, the aggregate partial signature s, along with nonce pubkey R, is a valid signature for the public key PK. In some variations, the message signing system 112 verifies the signature (R, s) with message m and PK and verifies that the nonce value R has not been previously used. Prior to aggregation, the message signing system 112 can optionally verify that each partial signature uses the same R value.

S236 functions to provide the generated signature (and/or signed message) to at least one system (e.g., the external system 104, a blockchain network associated with the message, etc.) as a response to the signing request.

Figure 10:
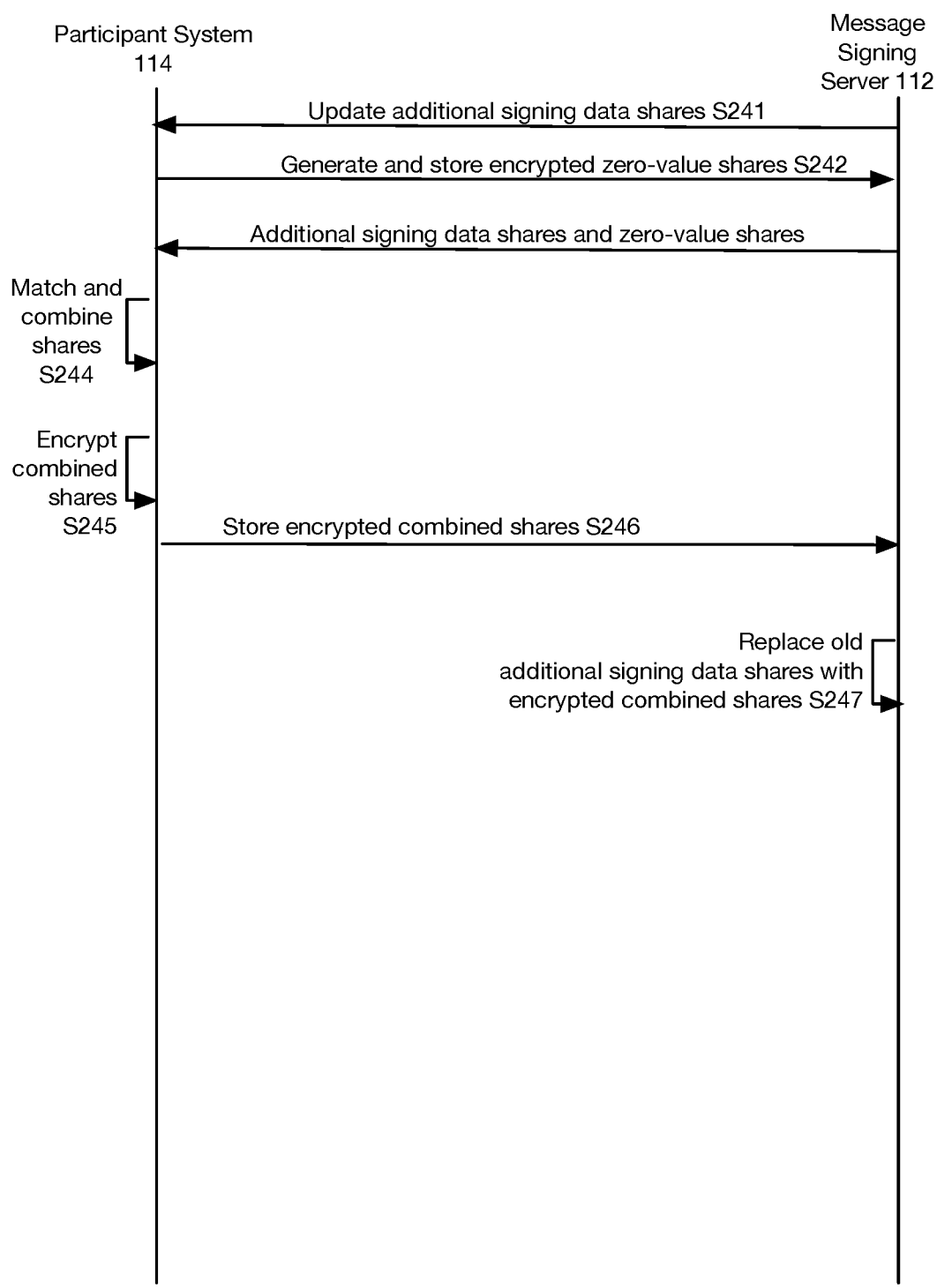
FIG. 10 is a representation of a proactive secret sharing, in accordance with variations.

In variants, the method 200 includes performing proactive secret sharing S240 to improve security (e.g., as shown in FIG. 10). In some variations, performing proactive secret sharing includes each participant updating the additional signing data shares generated by the participant and replacing the existing additional signing data shares (stored at the message signing system 112) with the updated shares.

In variants, the message signing system 112 initiates proactive secret sharing by sending each participant system a request to update their additional signing data shares S241. The update request can be signed by using the authentication private key of the message signing system.

In some variations, in response to the update request, a participant system (e.g., 114a-c) splits a zero (0) value into n shares (zero-value shares), encrypts the zero-value shares to each of the participants, and stores the zero-value shares at the message signing system 112 (S242). In some implementations, the zero values are split as described herein for S340, encrypted as described herein for S350, and stored as described herein for S360.

In response to the zero-value shares from at least a threshold number of participants (e.g., t participants), the message signing system 112 provides each participant system with the encrypted additional signing data shares and the encrypted zero-value shares (from each participant) at S243.

The encrypted zero-value shares and the encrypted additional signing data shares are decrypted, as described herein for S450. Each zero-value share is matched with a corresponding additional signing data share (e.g., according to the participant that generated the share), and the two shares are combined (e.g., added) S244. The combined shares are encrypted to each of the participants S245, and stored at the message signing system 112 S246. In some implementations, combined shares are encrypted as described herein for S350, and stored as described herein for S360. In some implementations, the message signing system 112 replaces the old additional signing data shares with the encrypted combined shares S247. Since valid aggregated zero-value shares sum to zero, the aggregated value of the updated additional signing data shares does not change. However, if a malicious system does not have zero-value shares, then the malicious system will not be able to produce a valid partial signature (e.g., a partial signature that can be combined with other partial signatures to form a valid full signature).

However, proactive secret sharing can otherwise be performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A distributed cryptographic signing method, comprising, with a message signing system:
   receiving a message associated with a public signing key;
   facilitating collective generation of a set of nonce shares by using participant systems for each participant in a first set of message signing participants, wherein each participant system for a participant in the first set:
   generates a nonce seed,
   generates a nonce based on: the generated nonce seed, the message, the public signing key, and a respective share of a private signing key associated with the public signing key,
   splits the nonce into nonce shares, and
   encrypts each nonce share to a respective message signing participant;
   facilitating collective generation of a signature for the message by using participant systems for each participant in a second set of message signing participants, wherein each participant system for a participant in the second set generates a partial signature based on nonce shares that are encrypted to the participant, wherein the message signing system generates the signature by aggregating the partial signatures; and generating a signed message by appending the signature to the message.

2. The method of claim 1, wherein the message signing system facilitates collective generation of the signature in response to receiving nonce shares from a threshold number of participant systems.

3. The method of claim 1, further comprising: with the message signing system:
identifying a set of public key message signing participants that are associated with the public signing key, wherein the set of public key message signing participants includes the first set and the second set; and
accessing shares of the private signing key for each message signing participant in the identified set of public key message signing participants.

4. The method of claim 3, wherein each share of the private signing key is encrypted to a respective one of the message signing participants in the identified set of public key message signing participants.

5. The method of claim 3, wherein facilitating collective generation of a set of nonce shares comprises:
securely providing to a participant system for each message signing participant in the identified set of public key message signing participants:
the message,
the public signing key, and
the respective share of the private signing key; and
securely receiving from each participant system of the first set of message signing participants:
a nonce share for each message signing participant in the identified set of public key message signing participants.

6. The method of claim 5, wherein facilitating collective generation of a signature for the message comprises:
securely providing to the participant system for each message signing participant in the identified set of public key message signing participants: the respective nonce shares that are provided by the participant systems of the first set; and
securely receiving from each participant system of the second set of message signing participants: the partial signature generated by the participant system,
wherein the message signing system generates the signature for the message in response to receiving a partial signature from a threshold number of participant systems.

7. The method of claim 3, wherein facilitating collective generation of a set of nonce shares comprises:
securely providing to a participant system for each message signing participant in the identified set of public key message signing participants:
the message,
the public signing key,
the respective share of the private signing key, and
a proof for the share of the private signing key; and
securely receiving from each participant system of the first set of message signing participants:
a nonce share for each message signing participant in the identified set of public key message signing participants, and
a nonce share proof for each nonce share.

8. The method of claim 7, wherein facilitating collective generation of a signature for the message comprises:
securely providing to the participant system for each message signing participant in the identified set of public key message signing participants: the respective nonce shares and nonce share proofs that are provided by the participant systems of the first set; and
securely receiving from each participant system of the second set of message signing participants: the partial signature generated by the participant system,
wherein the message signing system generates the signature for the message in response to receiving a partial signature from a threshold number of participant systems.

9. The method of claim 1, further comprising, the message signing system receiving the shares of the private signing key from a secure key generation system that is external to the message signing system and the participant systems.

10. The method of claim 9, further comprising, the message signing system receiving proofs for the shares of the private signing key from the secure key generation system, wherein each proof is a Verifiable Secret Sharing (VSS) proof.

11. The method of claim 1, wherein each participant system for each participant in the first set of message signing participants randomly generates the respective nonce seed.

12. The method of claim 1, further comprising: with the message signing system: receiving, from at least a threshold number of participant systems, updated versions of the nonce shares that have been generated by a proactive secret sharing process.

13. The method of claim 1, wherein at least one participant system is a mobile device with a persistent connection to a public communication network.

14. The method of claim 1, wherein the message signing system receives the nonce shares and the partial signatures in response to at least one authorization input received from a participant via a user interface.

15. The method of claim 1, wherein the signature is an ED25519 signature.

16. The method of claim 1, wherein the signature is one of a Boneh-Lynn-Shacham (BLS) signature, and a Schnorr signature.

17. A distributed cryptographic signing system, comprising,
a message signing system; and
a plurality of message signing participant systems,
wherein the message signing system comprises memory storing machine-executable instructions that, when executed by the message signing system, control the message signing system to:
receive a message associated with a public signing key;
facilitate collective generation of a set of nonce shares by using message signing participant systems for each participant in a first set of message signing participants, wherein each participant system for a participant in the first set:
generates a nonce seed,
generates a nonce based on: the generated nonce seed, the message, the public signing key, and a respective share of a private signing key associated with the public signing key,
splits the nonce into nonce shares, and
encrypts each nonce share to a respective message signing participant;
facilitate collective generation of a signature for the message by using message signing participant systems for each participant in a second set of message signing participants, wherein each participant system for a participant in the second set generates a partial signature based on nonce shares that are encrypted to the participant, wherein the message signing system generates the signature by aggregating the partial signatures; and generate a signed message by appending the signature to the message.

18. The system of claim 17, further comprising a secure key generation system that is constructed to generate the shares of the private signing key associated with the public signing key.

19. The system of claim 17, wherein the message signing system comprises machine-executable instructions that, when executed by the message signing system, control the message signing system to:

identify a set of public key message signing participants that are associated with the public signing key, wherein the set of public key message signing participants includes the first set and the second set; and access shares of the private signing key for each message signing participant in the identified set of public key message signing participants.

20. The system of claim 17, wherein the message signing system is constructed to facilitate collective generation of the signature in response to receiving nonce shares from threshold number of participant systems.

* * * * *